United States Patent
Wang et al.

(10) Patent No.: US 10,530,991 B2
(45) Date of Patent: Jan. 7, 2020

(54) REAL-TIME SEMANTIC-AWARE CAMERA EXPOSURE CONTROL

(71) Applicant: Microsoft Technology Licensing, LLC, Redmond, WA (US)

(72) Inventors: Baoyuan Wang, Redmond, WA (US); Sing Bing Kang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 8 days.

(21) Appl. No.: 15/671,067

(22) Filed: Aug. 7, 2017

(65) Prior Publication Data
US 2018/0220061 A1    Aug. 2, 2018

Related U.S. Application Data

(60) Provisional application No. 62/451,689, filed on Jan. 28, 2017.

(51) Int. Cl.
*H04N 5/232* (2006.01)
*G06K 9/00* (2006.01)
(Continued)

(52) U.S. Cl.
CPC ..... *H04N 5/23216* (2013.01); *G06K 9/00664* (2013.01); *G06N 3/02* (2013.01);
(Continued)

(58) Field of Classification Search
CPC ............. H04N 5/23216; H04N 5/2356; H04N 5/23293; H04N 5/2351; G06N 3/08;
(Continued)

(56) References Cited

U.S. PATENT DOCUMENTS

| 7,205,891 B1 * | 4/2007 | McGlothlin .......... H04L 65/602 340/539.25 |
| 7,903,168 B2 | 3/2011 | Pillman et al. |

(Continued)

FOREIGN PATENT DOCUMENTS

| CN | 10561118 A | 5/2016 |
| WO | 2007053703 A2 | 5/2007 |

OTHER PUBLICATIONS

Messina, et al., "Image quality improvement by adaptive exposure Correction techniques", In Journal of International Conference on Multimedia and Expo, Jul. 6, 2003, 4 pages.
(Continued)

*Primary Examiner* — Lin Ye
*Assistant Examiner* — Chan T Nguyen
(74) *Attorney, Agent, or Firm* — Alleman Hall Creasman & Tuttle LLP

(57) ABSTRACT

An "Exposure Controller" provides various techniques for training and applying a deep convolution network to provide real-time automated camera exposure control, as a real-time function of scene semantic context, in a way that improves image quality for a wide range of image subject types in a wide range of real-world lighting conditions. The deep learning approach applied by the Exposure Controller to implement this functionality first uses supervised learning to achieve a good anchor point that mimics integral exposure control for a particular camera model or type, followed by refinement through reinforcement learning. The end-to-end system (e.g., exposure control and image capture) provided by the Exposure Controller provides real-time performance for predicting and setting camera exposure values to improve overall visual quality of the resulting image over a wide range of image capture scenarios (e.g., back-lit scenes, front lighting, rapid changes to lighting conditions, etc.).

11 Claims, 10 Drawing Sheets

Exemplary Overview of the "Exposure Controller"

(51) Int. Cl.
    *G06N 3/02*           (2006.01)
    *H04N 5/235*         (2006.01)
    *G06N 3/04*           (2006.01)
    *G06N 3/08*           (2006.01)

(52) U.S. Cl.
    CPC .............. *G06N 3/0454* (2013.01); *G06N 3/08* (2013.01); *H04N 5/2351* (2013.01); *H04N 5/2356* (2013.01); *H04N 5/23293* (2013.01)

(58) Field of Classification Search
    CPC .... G06N 3/0454; G06N 3/02; G06K 9/00684; G06K 9/00664
    USPC ......................................................... 348/362
    See application file for complete search history.

(56) References Cited

U.S. PATENT DOCUMENTS

| | | | |
|---|---|---|---|
| 9,407,814 | B2 | 8/2016 | Pajak et al. |
| 2002/0122596 | A1 | 9/2002 | Bradshaw |
| 2004/0130649 | A1 | 7/2004 | Lee |
| 2005/0105776 | A1 | 5/2005 | Luo et al. |
| 2008/0100853 | A1 | 5/2008 | Eschbach |
| 2014/0229407 | A1* | 8/2014 | White ................... G06Q 10/10 706/12 |
| 2016/0277673 | A1 | 9/2016 | Carr et al. |
| 2016/0284095 | A1* | 9/2016 | Chalom ............. H04N 5/23229 |

OTHER PUBLICATIONS

Shirvaikar, Mukul V., "An Optimal Measure for Camera Focus and Exposure", In Proceedings of the Thirty-Sixth Southeastern Symposium on System Theory, Mar. 16, 2004, 4 pages.

Sinha, et al., "Semantics in Digital Photos: a Contenxtual Analysis", In Proceedings of IEEE International Conference on Semantic Computing, Aug. 2008, pp. 58-65.

Sheikh, Hamid Rahims, "Image Quality Assessment Using Natural Scene Statistics", In Doctoral Dissertation of the University of Texas at Austin, May 2004, 231 pages.

Allesiardo, et al., "A Neural Networks Committee for the Contextual Bandit Problem", In Journal of Computing Research Repository, Sep. 2014, 8 pages.

Dai, et al., "Instance-aware Semantic Segmentation via Multi-task Network Cascades", In Proceedings of IEEE Conference on Computer Vision and Pattern Recognition, Jun. 27, 2016, pp. 3150-3158.

Gatys, et al., "Image Style Transfer Using Convolutional Neural Networks", In Proceedings of IEEE Conference on Computer Vision and Pattern Recognition, Jun. 27, 2016, pp. 2414-2423.

Guo, et al., "Auto-Exposure Algorithm based on Luminance Histogram and Region Segmentation", In Journal of Applied Mechanics and Materials, vol. 543-547, Mar. 2014.

Han, et al., "Deep Compression: Compressing Deep Neural Networks with Pruning, Trained Quantization and Huffman Coding", In Proceedings of International Conference on Learning Representations, May 2, 2016, pp. 1-14.

Hasinoff, et al., "Burst photography for high dynamic range and low-light imaging on mobile cameras", In Journal of ACM Transactions on Graphics, vol. 35, Issue 6, Nov. 2016, 12 pages.

He, et al., "Deep Residual Learning for Image Recognition", In Proceedings of IEEE Conference on Computer Vision and Pattern Recognition, Jun. 27, 2016, pp. 770-778.

Hinton, et al., "Distilling the Knowledge in a Neural Network", In Journal of Computing Research Repository, Mar. 2015, pp. 1-9.

Iandola, et al., "SqueezeNet: AlexNet-Level Accuracy with 50x Fewer Parameters and ( 1MB Model Size", In Journal of Computing Research Repository, Feb. 2016, pp. 1-13.

Jia, et al., "Caffe: Convolutional Architecture for Fast Feature Embedding", In Proceedings of 22nd ACM international conference on Multimedia, Nov. 3, 2014, pp. 675-678.

Khosla, et al., "Understanding and Predicting Image Memorability at a Large Scale", In Proceedings of International Conference on Computer Vision, Dec. 13, 2015, pp. 2390-2398.

Krizhevsky, et al., "ImageNet Classification with Deep Convolutional Neural Networks", In 26th Annual Conference on Neural Information Processing Systems, Dec. 3, 2012, pp. 1-9.

Lecun, et al., "Efficient BackProp",In Proceedings of Neural Networks: Tricks of the Trade, this book is an outgrowth of a NIPS workshop, 1996, 44 pages.

Li, et al., "A Contextual-Bandit Approach to Personalized News Article Recommendation", In Proceedings of 19th International Conference on World Wide Web, Apr. 26, 2010, pp. 661-670.

Lischinski, et al., "Interactive Local Adjustment of Tonal Values", In Proceedings of ACM SIGGRAPH Papers, Jul. 30, 2006, pp. 646-653.

Liu, et al., "Fast Burst Images Denoising", In Journal of ACM Transactions on Graphics, vol. 33, Issue 6, Nov. 2014, 9 pages.

Gevers, et al., "Color constancy by deep learning", In Proceedings of British Machine Vision Conference, Sep. 7, 2015, pp. 1-12.

Lu, et al., "Rapid: Rating pictorial aesthetics using deep learning", In Proceedings of the 22nd ACM international conference on Multimedia, Nov. 3, 2014, pp. 457-466.

Lu, et al., "Deep Multi-Patch Aggregation Network for Image Style, Aesthetics, and Quality Estimation", In Proceedings of IEEE International Conference on Computer Vision, Dec. 7, 2015, 9 pages.

Mai, et al., "Composition-preserving deep photo aesthetics assessment", In Proceedings of IEEE Conference on Computer Vision and Pattern Recognition, Jun. 27, 2016, pp. 497-506.

Radford, et al., "Unsupervised representation learning with deep convolutional generative adversarial networks.", In Journal of Computing Research Repository, Nov. 2015, pp. 1-16.

Rastegari, et al., "XNOR-Net: ImageNet Classification Using Binary Convolutional Neural Networks", In Journal of Computing Research Repository, Mar. 2016, pp. 1-17.

Redmon, et al., "You Only Look Once: Unified, Real-Time Object Detection", In Proceedings of IEEE Conference on Computer Vision and Pattern Recognition, Jun. 27, 2016, 10 pages.

Kremens, et al., "System implications of implementing autoexposure on consumer digital cameras", In Proceedings of SPIE 3650, Sensors, Cameras, and Applications for Digital Photography, Mar. 22, 1999, 8 pages.

Szegedy, et al., "Going Deeper with Convolutions", In Proceedings of IEEE Conference on Computer Vision and Pattern Recognition, Jun. 7, 2015., pp. 1-12.

Williams, et al., "Simple statistical gradient-following algorithms for connectionist reinforcement learning", In Journal of Journal of Machine Learning, vol. 8, Issue 3-4, May 1992, pp. 1-27.

Yan, et al., "Automatic photo adjustment using deep neural networks", In Journal of ACM Transactions on Graphics, vol. 35, Issue 2, Feb. 2016., 15 pages.

Yuan, et al., "Automatic exposure correction of consumer photographs", In Proceedings of the 12th European conference on Computer Vision—vol. Part IV, Oct. 7, 2012, 14 pages.

Wang, et al., "Example-based image color and tone style enhancement", In Proceedings of 38th International Conference and Exhibition on Computer and Interactive Techiniques, Aug. 7, 2011, pp. 1-11.

Ondieki, Bavin,"Convolutional Neural Networks for Scene Recognition CS231N", Retrieved from: <<http://cs231n.stanford.edu/reports/2015/pdfs/ondieki_final_paper.pdf>>, Retrieved on: Mar. 8, 2018, 7 Pages.

Berthold, et al., "Unsupervised Learning of Camera Exposure Control using Randomly Connected Neural Networks", Retrieved from <<https://www2.informatik.hu-berlin.de/~oberthol/pdf/Unsupervised%20learning%20of%20camera%20exposure%20control%20using%20randomly%20connected%20neural%20networks%20-%20Oswald%20Berthold.pdf>>, Sep. 10, 2013, 6 Pages.

Dettmers, Tim, "Deep Learning in a Nutshell: Reinforcement Learning",Retrieved from: <<https://devblogs.nvidia.com/deep-learning-nutshell-reinforcement-learning/>>, Sep. 8, 2016, 13 Pages.

Juliani, Arthur, "Simple Reinforcement Learning with Tensorflow Part 1.5: Contextual Bandits", Retrieved from: <<https://medium.

(56) References Cited

OTHER PUBLICATIONS com/emergent-future/simple-reinforcement-learning-with-tensorflow-part-1-5-contextual-bandits-bff01d1aad9c>>, Sep. 27, 2016, 2 Pages.
"International Search Report and Written Opinion Issued in PCT Application No. PCT/US2018/014602", dated Mar. 20, 2018, 13 Pages.

* cited by examiner

REAL-TIME SEMANTIC-AWARE CAMERA EXPOSURE CONTROL

CROSS-REFERENCE TO RELATED APPLICATIONS

This application claims the benefit under Title 35, U.S. Code, Section 119(e), of a previously filed U.S. Provisional Patent Application by Baoyuan Wang, et al., entitled "REAL-TIME SEMANTIC-AWARE CAMERA EXPOSURE CONTROL USING DEEP CONTEXTUAL-BANDIT LEARNING," Ser. No. 62/451,689, filed on Jan. 28, 2017.

BACKGROUND

Image post-processing operations are generally not successful at recovering visual information (also referred to as image data) that is lost due to either under- or over-exposure when capturing those images. Consequently, real-time auto-exposure is a fundamental operation applied by most consumer cameras in an attempt to capture high-quality photographs with proper exposure settings. For example, smartphone based cameras typical rely on simple metering over a predefined area or set of areas to find a suitable exposure. However, typical automated exposure systems often fail to provide acceptable image capture results in common scenarios.

Some commercial cameras apply various heuristic algorithms to detect faces or objects. Similarly, many cameras allow manual selection of region of interest (ROI) for local exposure adjustment. Typical metering techniques for performing automated exposure control tend to analyze an image or scene using intensity distributions or histograms that assume all content in the scene is equally important, or by considering other regions such as, for example, spot or matrix-based techniques. Such techniques may also consider fixed weighting based on a proximity to the image center, detected faces or objects, or some user selected focal point. As such, some of these cameras consider various types of scene semantics (e.g., face or object detection, etc.) when determining automated exposure correction or adjustments of a scene being photographed.

Unfortunately, in many back-lit situations, typical automated exposure control systems tend to produce poor contrast on the back-lit subject (e.g., a person, object, etc.) while providing good contrast of the background itself. For example, a person standing indoors in front of a bright window will tend to appear as a dark silhouette against that window given typical automated exposure control. Generally, this is the exact opposite of what the photographer would prefer, e.g., better contrast on the back-lit subject at the cost of the background being washed out. Conversely, a very dark background often causes a typical automated exposure control system to over-expose the foreground object of interest. In either case, use of incorrect exposure settings by the automated exposure control system results in the loss of image data.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

An "Exposure Controller" as described herein, provides various techniques for applying deep-learning based techniques to perform real-time automated camera exposure control (e.g., shutter speed, exposure time, ISO settings, aperture, white balance, etc.), depending on the exposure capabilities of the particular camera model or type being used. In other words, in various implementations, the Exposure Controller provides a real-time auto-exposure system that is trained to implicitly apply scene semantics (e.g., subject type, motion, faces, backlighting, etc.) to predict and set appropriate exposure values for the camera while optionally compensating for latency in camera firmware dynamics. Simply stated, in various implementations, the Exposure Controller automates predictive camera exposure selection based on implicit scene semantics (also referred to herein using terms such as "semantic context," "semantic-aware," or the like). Advantageously, the Exposure Controller enables typical cameras to bypass existing hardware metering functions while responding quickly and correctly to changes in scene and lighting condition by automatically predicting optimized exposure values in real-time in a computationally efficient manner.

For example, in various implementations, the camera operates in a continuous or periodic capture mode (also referred to as a "viewfinder mode" or the like) that continuously receives image frames (whether or not the user or some automated process has activated a camera shutter button or the like). Then, given a current frame captured by a camera, the Exposure Controller automatically predicts and sets a camera exposure value for a next frame to be captured in a way that optimizes a trade-off among image quality, fast convergence, and minimal temporal oscillation. As such, the camera can be moved through different scenes and lighting conditions while the Exposure Controller continuously predicts and updates exposure settings for capturing subsequent image as a function of the exposure and semantics of prior frames.

These real-time predictions are achieved by applying either a regression network (e.g., a pre-trained network (PTN) or a reward network (RN)) or a machine-learned contextual-bandit network (CBN), to each incoming frame to predict and set an optimized camera exposure value for the next frame. Optionally, a delay of zero or more frames is applied prior to capturing the next frame with the predicted exposure settings to account for any latency in camera firmware response times (e.g., how long it takes the camera to respond to instructions to set particular exposure settings). In other words, in various implementations, the Exposure Controller skips one or more frames subsequent to setting camera exposure before capturing the next frame with the predicted exposure settings to reduce a likelihood of oscillatory behavior in camera exposure settings.

In general, the RN is a machine-learned model or network that is trained on human scored image sets to emulate human perception with respect to gauging image exposure quality as a function of exposure settings and semantics associated with those scored image sets. In contrast, the PTN is generated by pre-training a deep convolution network (or other machine-learning model) using supervised learning to mimic the native exposure control system, including any existing semantic-aware exposure control features, of a particular camera type or model. The CBN is the generated by applying the RN to refine the PTN. More specifically, in various implementations, deep contextual bandit learning is applied to a combination of the PTN and the RN to jointly build a control agent and harvest discriminative semantic features, thereby generating a machine-learned model (i.e., the CBN) that provides real-time semantic-aware camera exposure control.

In other words, in various implementations, the PTN is fine-tuned via a deep contextual-bandit algorithm that considers training images and corresponding reward values derived from the RN to generate the aforementioned CBN. As such, relative to the use of the PTN or the RN alone, the resulting CBN further improves the capability of the Exposure Controller to provide real-time semantic-aware camera exposure control as a direct function of prior image frames.

In various implementations, the overall learning process begins by generating the PTN by pre-training a deep convolution network (or other machine-learning model) using supervised learning to mimic the native exposure control system, including any existing semantic-aware exposure control features, of a particular camera type or model. As such, the machine-learned PTN inherently provides the capability to predict exposure settings as an implicit function of scene semantics extracted from the current image frame. This enables the Exposure Controller to apply the trained PTN to an input image to find a suitable reference point near the optimum exposure value as an implicit function of scene semantics. Advantageously, the Exposure Controller can apply the PTN, whether or not it has been refined via the RN to generate the CBN, to predict and set a camera exposure value for a next frame to be captured from a current frame captured by the camera.

Further, because different camera models and types may have widely differing imaging capabilities with respect to exposure settings, training of the PTN, and thus the CBN, may be performed using images, and associated exposure control settings, captured by a particular camera model or type. As such, in cases where the PTN is trained on a particular camera model or type, the PTN, and thus the CBN, are hardware-dependent. In other words, both the PTN and the resulting CBN may be trained to predict optimized exposure control values in real-time for a particular camera model or type. In contrast, the aforementioned RN may be trained on arbitrary image sets captured from one or more arbitrary camera models or types. Advantageously, this means that once learned, the hardware-independent RN can be reused whenever training a new CBN for a particular camera model or type. However, any PTN and/or CBN trained on a particular camera model or type may also be applied to predict exposure settings for different camera models or types.

In addition, to ensure that the trained CBN is implicitly responsive to scene semantics (e.g., faces or objects against bright or dark backgrounds, indoor scenes, outdoor scenes, etc.), the training set for learning the RN is constructed to include as many examples of particular types of scene semantics as possible or feasible. For example, if it is desirable to ensure that faces are captured with proper contrast regardless of lighting conditions, then large numbers of images with faces in a variety of different lighting conditions will be included in the training data for learning the RN. Similar training sets, with any desired scene semantics and multiple different lighting conditions, are included when training the RN. Consequently, the RN will automatically learn features that reward images (based on image exposure) having any of the types of scene semantics on which it was trained. Advantageously, because the CBN is refined from the PTN using the RN, this enables the trained CBN to implicitly respond to scene semantics without actually evaluating scenes to determine scene content, thereby significantly improving performance of the CBN for real-time exposure control operations.

The Exposure Controller described herein provides various techniques for training and applying a deep convolution network to provide real-time automated camera exposure control, as a real-time function of scene semantics context, in a way that improves image quality for a wide range of image subject types in a wide range of real-world lighting conditions. In addition to the benefits described above, other advantages of the Exposure Controller will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
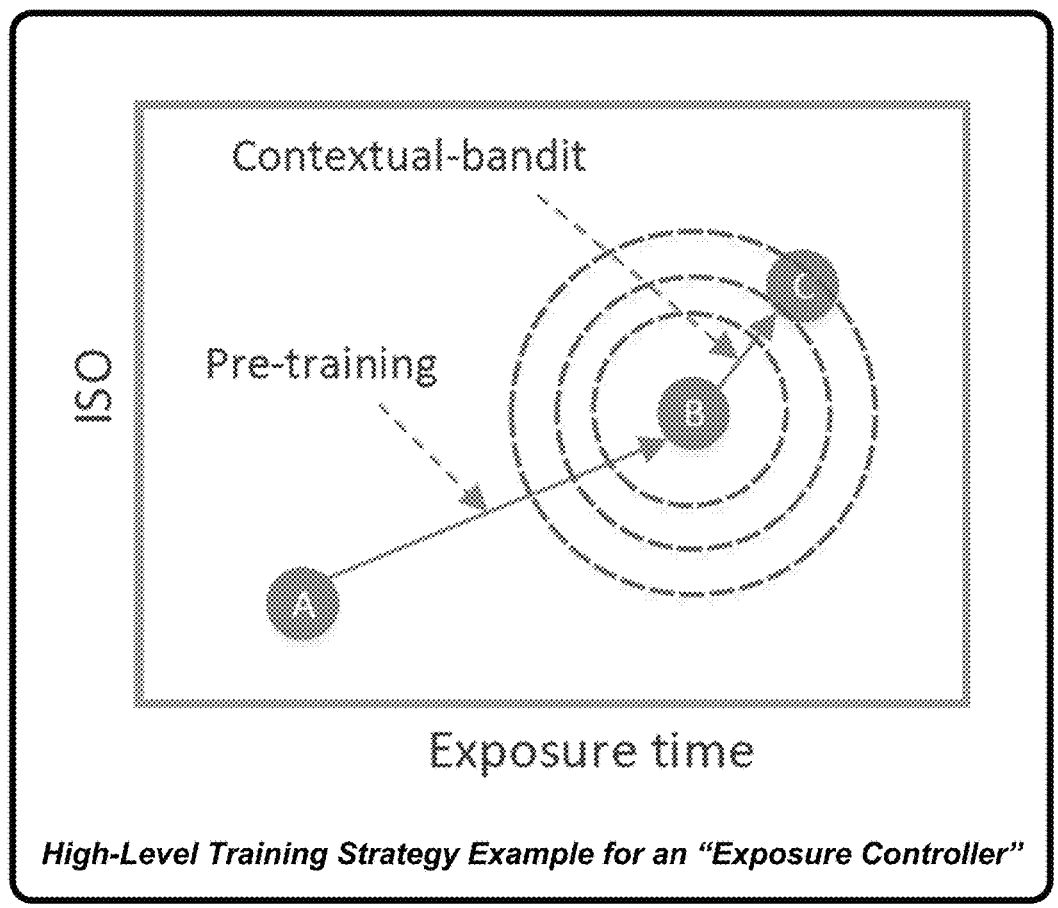
FIG. 1 illustrates a high-level training strategy example for an "Exposure Controller," as described herein.

In the following description of various implementations of an "Exposure Controller", reference is made to the accompanying drawings, which form a part hereof, and in which is shown by way of illustration specific implementations in which the Exposure Controller may be practiced. Other implementations may be utilized and structural changes may be made without departing from the scope thereof.

Specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Exposure Controller. Further, the appearance of such phrases throughout the specification are not necessarily all referring to the same implementation, and separate or alternative implementations are not mutually exclusive of other implementations. The order described or illustrated herein for any process flows representing one or more implementations of the Exposure Controller does not inherently indicate any requirement for the processes to be implemented in the order described or illustrated, and any such order described or illustrated herein for any process flows do not imply any limitations of the Exposure Controller.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

Deep convolution networks (sometimes referred to in the context of deep learning or deep neural networks) have widely been used with increasing success for a variety of computer vision tasks such as image classification, object detection and semantic segmentation. An "Exposure Controller," as described herein, further adapts deep convolution networks to perform real-time extraction of meaningful features from images. These extracted features are well tailored for use in the real-time exposure control operations performed by the Exposure Controller. In particular, the various deep convolution networks employed by the Exposure Controller consider these features to provide real-time auto-exposure as a trade-off among exposure accuracy, minimum temporal oscillation (e.g., a characteristic symptom of negative feedback structures in which the information used to take goal-seeking action is delayed), and small response latency. These last two features (i.e., temporal oscillation and response latency) are generally dependent on firmware and hardware of the camera on which the Exposure Controller is executing.

In general, the Exposure Controller provides various techniques that implicitly handle scene semantics for real-time auto-exposure via a process or application that executes in real-time during a viewfinder mode (sometimes also referred to as a preview mode or the like) of a camera. In various implementations, the viewfinder mode of the camera operates in a continuous or periodic capture mode that continuously receives image frames (whether or not the user or some automated process has activated a camera shutter button or the like) and continuously updates the exposure settings for capturing or receiving those images based on the predictions provided by the Exposure Controller. Advantageously, the Exposure Controller enables typical cameras to bypass existing hardware metering functions while responding quickly and correctly to changes in scene and lighting condition by automatically predicting optimized exposure values in real-time in a computationally efficient manner. Further, in contrast to existing hardware metering functions that consider the current content of a viewfinder to set exposure for capturing that current content, the Exposure Controller instead considers prior image frames such that Exposure Controller is response to changing scene semantics.

In other words, the Exposure Controller provides various techniques for training and applying a deep convolution network to provide real-time automated camera exposure control, as a real-time function of scene semantic context, in a way that improves image quality for a wide range of image subject types in a wide range of real-world lighting conditions. The deep learning approach applied to achieve this functionality first uses supervised learning to achieve a reasonably accurate initial exposure prediction capability by constructing a network (e.g., a "pre-trained network" (PTN)) that mimics the exposure control functionality, including any existing semantic-aware exposure control features, of a particular camera model or type, followed by refinement of that network through reinforcement learning via a machine-learned reward network (RN) to construct a contextual bandit network (CBN). In various implementations, the Exposure Controller can apply any of these machine-learned models, e.g., the PTN, the RN or the CBN, to provide automated semantic aware camera exposure control.

More specifically, given a current image frame $I_i$ (at time i) captured or received at exposure value $EV_i$, the Exposure Controller applies any of the PTN, the RN or the CBN to provide a real-time prediction of the next exposure value $EV_{i+1}$ that is then applied to capture or receive the corresponding frame $I_{i+1}$ by replacing or bypassing any exposure control settings resulting from any default or existing hardware metering functions of the camera on which the Exposure Controller is executing. In other words, in various implementations, the Exposure Controller bypasses the hardware metering function and predicts the exposure value $EV_{i+1}$ for next frame $I_{i+1}$ as a function of the current frame $I_i$ (at time i). Denoting regression function $F(I_i)$ as the function of predicting an exposure adjustment $\Delta_{EV}^i$ given input frame $I_i$, results in $F(I_i)=\Delta_{EV}^i$. The Exposure Controller then causes the camera to then apply $EV_{i+1}=EV_i+F(I_i)$ to capture the next frame $I_{i+1}$; this process is iterated in the live viewfinder mode.

Advantageously, the training strategy described herein is applicable to a wide range of problems in computational photography and computer vision. The end-to-end system provided by the Exposure Controller has been observed to provide real-time performance for predicting and setting camera exposure values to improve overall visual quality of images over a wide range of image capture scenarios (e.g., back-lit scenes, front lighting, rapid changes to lighting conditions, etc.) for scenes having particular semantics (e.g., faces or objects against bright or dark backgrounds, indoor scenes, outdoor scenes, etc.). Advantageously, the Exposure Controller implicitly adapts exposure values to particular scene semantics and lighting without explicitly evaluating the scene to determine scene content. In other words, because of the training process described herein, the Exposure Controller jointly considers both semantic information and lighting conditions and optimizes between the two while dynamically changing the exposure values.

2.0 Operational Details of the Exposure Controller:

The above-described program modules and/or devices are employed for instantiating various implementations of the Exposure Controller. As summarized above, the Exposure Controller provides various techniques training and applying a deep convolution network to provide real-time automated camera exposure control, as a real-time function of scene semantic context, in a way that improves image quality for a wide range of image subject types in a wide range of real-world lighting conditions. The following sections provide a detailed discussion of the operation of various implementations of the Exposure Controller, and of exemplary methods and techniques for implementing the features and program modules described in Section 1. In particular, the following sections provides examples and operational details of various implementations of the Exposure Controller, including:

Camera exposure and model training considerations;
Exposure Controller overview;
Supervised pre-training of the CBN (i.e., generation of the PTN);
Hardware-independent reward network (RN);
Contextual-bandit learning of the CBN from the PTN and RN;
Attention modeling for considering regions of interest in an image; and
Additional considerations.

2.1 Camera Exposure and Model Training Considerations:

Real-time auto-exposure for cameras typically involves simple low-level analysis of the scene brightness (using a process called metering) to optimize exposure. However, typical auto-exposure techniques don't always account for scene semantics, e.g., presence of faces or objects of interest relative to the overall scene within the viewfinder of the camera. In addition, typical auto-exposure techniques do not generally consider temporal exposure control to account for the dynamics of the camera system, e.g., possible delay in executing a command based on factors such as, for example, camera firmware response times. If the change in exposure is too high, the temporal behavior may be oscillatory (i.e., temporal oscillation) or unstable (the exposure fluctuates between the upper and lower limits), while too small a change may result in slow convergence on the exposure value.

In various implementations, the Exposure Controller addresses the issue of possible camera response time delays with respect to executing a command to modify camera exposure settings by skipping one or more frames or waiting for convergence on exposure values. Advantageously, this reduces the likelihood of oscillatory behavior in camera responses. For example, one technique employed by the Exposure Controller to address the issue of latency in camera firmware response times for setting exposure values is to create or apply a delay of zero or more frames prior to capturing the next frame with the predicted exposure settings to account for any latency in camera firmware response times (e.g., how long it takes the camera to respond to instructions to set particular exposure settings).

Many typical cameras determine an exposure value (denoted as EV) based on an exposure equation defined as:

$$\frac{LS}{K} = \frac{N^2}{t}, \quad \text{Equation (1)}$$

where N is the aperture (f-number), t is the exposure time (inverse of "shutter speed") in seconds, L is the average scene luminance, S is the ISO speed, and K is a constant (commonly set to 12.5). For a typical mobile camera (e.g., a camera in a mobile phone or the like), N is fixed as well.

In photography, EV is a number that represents the combination of t and N such that all combinations that yield the same exposure have the same EV for any fixed scene luminance L. In practice, EV is typically defined in base-2 logarithmic scale. For example, when applied to the left-hand side of Equation (1), EV defines the target exposure value and is computed as $$EV = \log_2 \frac{LS}{K}.$$

Similarly, when applied to the right-hand side of Equation (1), EV represents the camera setting and is computed as $$EV = \log_2 \frac{N^2}{t}.$$

A "correct" exposure is achieved when both versions of EV match. For example, given the same lighting condition, increasing ISO S would increase the EV value which can be matched by decreasing the exposure time t; given a fixed ISO S, decreasing L requires t to be increased. For a typical mobile camera, only ISO and exposure time (also referred to herein simply as "exposure") can be adjusted. Consequently, for such cameras, Equation (1) can be written for ISO and exposure time, EV can be redefined as:

$$EV = \log_2 \frac{1}{t*S} + \log_2(K*N^2) \quad \text{Equation (2)}$$

Because the second term, $\log_2(K*N^2)$, of Equation (2) is constant for a camera, the exposure adjustment, $\Delta_{EV}$, will involve t and S. This simplifies the training of the deep neural network based processes applied to implement the Exposure Controller. For example, to control EV as a function of scene semantics, one simple hypothetical approach is to apply exposure bracketing to capture various images with different exposure values to create a dataset, then conduct a labeling exercise selecting an optimized exposure. Subsequently, supervised learning can be applied to learn a regression function F that can map from any incorrect exposure to its correct one. In such an approach, the optimized exposure is predicted at each time step and the current captured image is fed into the regression network to obtain the desired change in exposure ($\Delta_{EV}$). While this simple hypothetical may be implemented as a functioning system, this simple hypothetical requires collecting a large dataset, for each different camera model or type, that is manually intensive.

Advantageously, the techniques described in the following paragraphs enable implementation of the Exposure Controller across a wide range of camera models or types while significantly reducing the data collection burden for different cameras.

In various implementations, the Exposure Controller addresses this practical challenge via an approach that is scalable for both data collection and annotation over a wide range of camera models or types (collectively referred to as a "native camera" or the like). For example, in various implementations, the Exposure Controller leverages the fact that native cameras perform well in many cases with respect to automatic exposure control, including some capabilities of these native cameras to employ various semantic-aware exposure control features. As such, the machine-learned PTN inherently mimics these exposure control capabilities to predict exposure settings for capturing a next image frame as an implicit function of scene semantics extracted from the current image frame. Consequently, in various implementations, the training processes described herein are initialized using native camera performance and exposure control settings. In cases where the native camera does not perform well (e.g., in back-lit scenes), an on-line approach can be applied to interactively collect training images and corresponding feedback on exposure quality to update the machine-learned model.

In various implementations, the Exposure Controller is adapted to predict exposure settings as well as the native camera for "normal" cases (e.g., scenes with good uniform lighting) while then improving on more challenging scenes that consider object prioritization (e.g., in back-lit scenes). In various implementations, a "coarse-to-fine" learning strategy is applied to achieve these results. In general, the "coarse" part of this learning strategy includes pre-training the PTN using image native camera images and exposure setting data, while the "fine" part of this learning strategy includes fine-tuning of the PTN using an on-line learning approach that includes the aforementioned RN. Advantageously, this on-line learning is designed to support and further enhance semantic-aware exposure prioritization and control features of the Exposure Controller.

For example, during the on-line stage, at time t, the existing camera hardware chooses one specific EV and captures a corresponding image I, which is unlike full exposure bracketing. In various implementations, training data used during this on-line stage includes receiving user feedback on the exposure provided by the existing camera hardware after the capture. For example, such feedback may include, but is not limited to, a user indication of whether the training image is under-exposed, correctly exposed, over-exposed, etc. Such feedback serves as a reward signal to indirectly supervise how the Exposure Controller intelligently selects $\Delta_{EV}$ for a given image. As such, the training process is designed to achieve the proper $\Delta_{EV}$ to trade-off among the quality of steady-state, convergence speed, and stable behavior (e.g., no temporal oscillation).

Interactively providing feedback for the training process is useful, but convergence will not be fast. As such, in various implementations, to scale up learning, the Exposure Controller applies a machine-learned reward network (RN) that correlates the semantics of image content and exposure with visual quality. This semantic-aware RN is designed to emulate human perception to gauge exposure quality for a variety of image types and scene semantics. Advantageously, the RN is hardware independent (e.g., applicable to arbitrary camera types or models) and may itself be applied to predict semantic-aware exposure values for arbitrary cameras. In various implementations, the RN is applied to automate the entire learning process for refining the PTN rather than requesting user feedback as images are captured.

In general, in a contextual-bandit based algorithm, each arm or action represents an object selection from a large pool of possible objects. An "agent" of this algorithm then learns a policy to determine which object to select to optimize some particular metric or context. These techniques are adapted for use by various implementations of the Exposure Controller to refine the PTN by treating each EV combination (e.g., ISO and exposure time) as an action, and the current captured frame as its contextual information. The exposure control (e.g., the agent) then learns a policy of optimum EV selection for each frame.

For example, for contextual-bandit learning to refine the PTN, each image frame $I_i$ provides contextual information, each discretized $\Delta_{EV}$ serves as an action, and exposure quality of the captured image guided by RN is a reward signal. One intent of this process is to maximize an accumulated reward over all the training images for a number of learning iterations.

FIG. 1 illustrates one example of the aforementioned learning strategy. Assume that the ideal exposure value adjustment $\Delta_{EV}$ changes from point A to point C in a 2D camera setting space delimited by exposure time (x-axis) and ISO (y-axis). A supervised pre-training process is first performed to mimic the native camera exposure control by learning the aforementioned PTN, which enables a change from point A to point B. To further improve on point B, the CBN is trained, with that CBN being supervised by a separate hardware-independent reward network (RN). In other words, the PTN is refined via the RN to learn the CBN, which is then applied to as a standalone model to predict semantic-aware exposure settings in real time for use by the Exposure Controller. As mentioned, any or all of the PTN, the RN and the CBN may be used as a standalone model to predict semantic-aware exposure settings in real time for use by the Exposure Controller.

Following training of the various models (e.g., the PTN, the RN and/or the CBN), during run-time, a current image captured by the camera is fed to a control network (e.g., the machine-learned PTN, RN and/or CBN) which runs a feed-forward a single time to generate the output $\Delta_{EV}$. The predicted output $\Delta_{EV}$ is then applied to the camera to capture the next image. Further, in various implementations, the capture of the next image using the predicted exposure settings is delayed for zero or more frames following application of the predicted exposure settings to the camera by the Exposure Controller. This optional delay accounts for any latency of the camera firmware in responding to the exposure settings provided to the camera by the Exposure Controller. In other words, in various implementations, based on a latency of a firmware response time of the camera, the camera applies the predicted camera exposure values provided by the Exposure Controller to capture a next image frame following an optional delay of zero or more of the continuously captured frames after applying the predicted camera exposure values. Simply stated, this optional delay gives the camera hardware time to implement the predicted exposure settings provided by the Exposure Controller.

Figure 2:
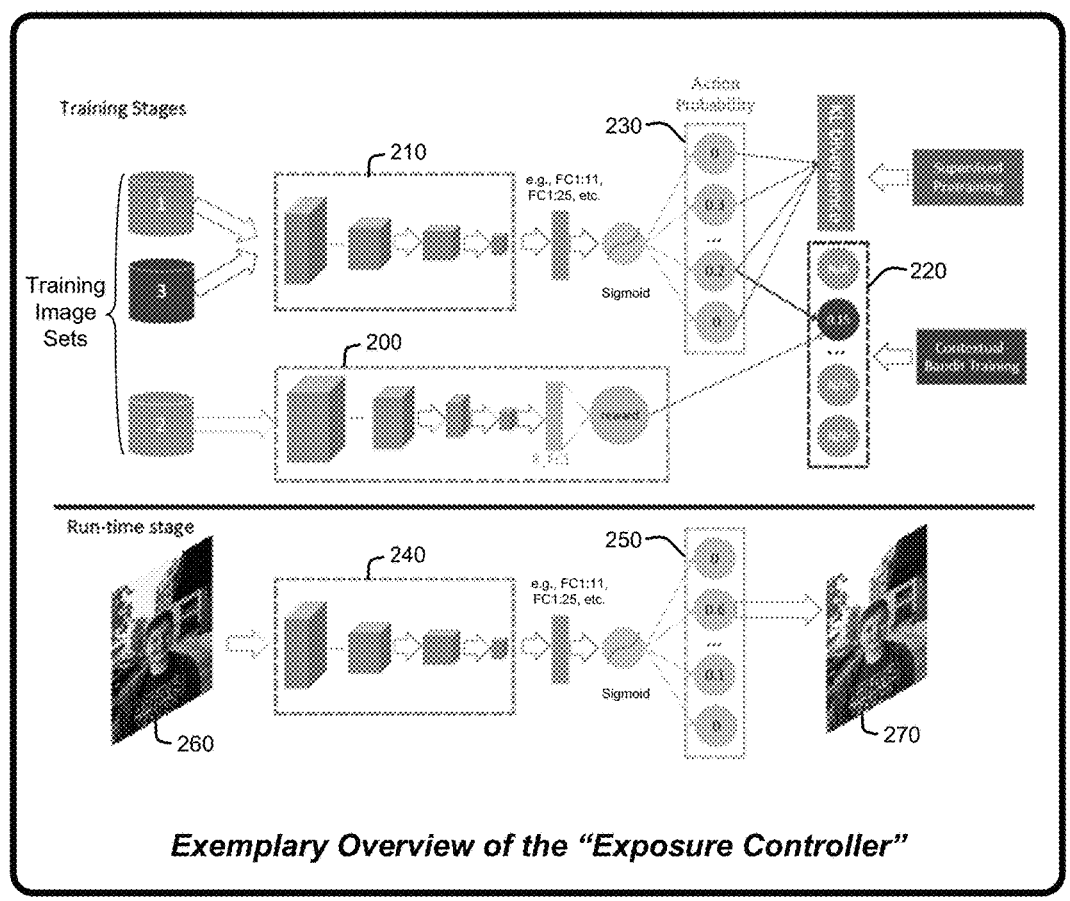
FIG. 2 provides an exemplary overview of the Exposure Controller, as described herein.

2.3 Exposure Controller Overview:

An overview of the Exposure Controller is shown in FIG. 2. In various implementations, the Exposure Controller includes two basic parts. One of these two parts is the aforementioned reward network (RN), delimited by dashed box 200, which is trained (using image set 2) to correlate visual quality based on both image content and exposure. Advantageously, the RN is independent of the camera firmware. In other words, the RN is applicable to a wide range of camera models and types without being specifically trained for different cameras. The second of these two basic parts is the aforementioned PTN and the refinement of the PTN to produce the contextual bandit network (CBN) (trained on image sets 1 and 3), delimited by dashed box 210. At each particular step of CBN, one action and the corresponding reward can be observed, with the rewards of other actions (illustrated within dashed box 220) not available. The probability of each action is stored in a layer depicted within dashed box 230.

In general, the CBN works in conjunction with the RN to improve the exposure control predictions through scene understanding. More specifically, the RN is used to guide CBN to maximize the total reward for all the training data. Unlike fully supervised learning, contextual-bandit learning observes indirect labeled data. This is because, at each time step t, the camera selects one action (i.e., camera setting) to capture an image, and the exposure value then takes effect after the image is captured. The label information (i.e., the reward) is also missing for all other actions at time step t.

It has been observed that contextual-bandit learning is appropriate for on-line learning for auto-exposure because it can handle such incomplete data. This is useful for implementing the Exposure Controller because it does not require extensive data labeling. In general, training the CBN within a deep convolution network remains challenging due to convergence issues.

For example, directly training the CBN from scratch would use large amounts of data and result in relatively slow convergence. Instead, in various implementations, the CBN is first trained (to generate the aforementioned PTN) via supervised learning to replicate the hardware's default exposure control behavior of some particular camera model or type. The resulting PTN can then provide acceptable initial estimates for $\Delta_{EV}$. In various implementations, the PTN is further trained to locally refine $\Delta_{EV}$, thereby generating the CBN. This significantly simplifies learning while being more likely to provide an improved local minimum. In addition, because fine-tuning is done in an end-to-end training fashion, the CBN can more easily customize the learned semantic features embedded in all the layers to handle exposure control. Further, additional training will eventually improve robustness and accuracy of the control policy of the Exposure Controller for predicting semantic-aware exposure values.

During run-time, the RN is no longer required, because, as mentioned, it is used to generate labels for training. However, as mentioned, any of the PTN, the RN, and the CBN can be used by the Exposure Controller to predict semantic-aware exposure settings. For example, assuming use of the CBN, during run-time, given an input image, the Exposure Controller applies the trained CBN (shown as dashed box 240 in the Run-time stage) to select the action (within dashed box 250) that returns the exposure value with the largest probability. This selected exposure value is then applied to the camera to capture the next image frame. In other words, during run-time, the current frame 260 is directly fed to the into CBN, with a single feed-forward of this input frame being run once to select the output $\Delta_{EV}$ (with largest probability value from 250) from the probability layer. The output is then used to determine the next exposure value for capturing the next frame 270. Advantageously, the simplicity of this process makes the Exposure Controller simple to deploy on existing cameras.

2.4 Supervised Pre-Training for the CBN:

In various implementations, the Exposure Controller applies supervised pre-training to large numbers of images and associated exposure settings to learn a regression network, e.g., the PTN, that mimics the native camera control behavior (e.g., native automated exposure settings associated within the particular camera model or type for which the PTN and CBN are being trained), including any existing semantic-aware exposure control features of the native camera. As such, the machine-learned PTN inherently provides the capability to predict exposure settings as an implicit function of scene semantics extracted from the current image frame.

More specifically, some or all of the cameras that provide training images for learning the PTN determine or consider various types of scene semantics (e.g., face or object detection in combination with a variety of lighting conditions, etc.) when determining automated exposure correction or adjustments of a scene being photographed. As such, the trained PTN will inherently include similar scene semantic-aware automated exposure capabilities. In other words, because the PTN mimics the native automated exposure settings associated within the cameras that provide the training images, the PTN will inherently include and mimic any semantic exposure control capabilities of those cameras. In addition, although the PTN can be trained on images from a particular camera model or type, the PTN may also be trained on images from multiple different camera types. Further, the PTN trained for any particular camera models or types may optionally be applied to different camera models or types.

In various implementations, the PTN is then refined via the RN, which learns semantic-aware discriminative features that are specifically tailored for exposure control, to generate the CBN. As a result, refinement of the PTN via the RN causes the resulting CBN to implicitly learn semantic-aware discriminative features that are specifically tailored for exposure control. In general, the PTN is the same as CBN, except that the PTN and CBN: (1) use a different loss function, (2) are trained on different datasets, and (3) are trained with a different strategy.

Intuitively, the CBN can be thought of as the representation of a nonlinear function for mapping any image/to an appropriate exposure adjustment, denoted as $\Delta_{EV}$. Compared with the unrefined PTN, the CBN provides improved implicit correlation of semantic information of a particular image frame with the optimal exposure value. In addition, the CBN also generalizes well to unseen images because of the refinement of the PTN via the RN.

From a data-collection standpoint, supervised pre-training for mimicking native camera exposure control behavior can be conducted easily on a relatively large scale image data set that does not require human annotation. Consequently, once trained, the PTN is expected to perform as well as the native camera exposure control processes, including any existing semantic-aware exposure control features of that native camera. As such, the machine-learned PTN inherently provides the capability to predict exposure settings as an implicit function of scene semantics extracted from the current image frame. Advantageously, by optionally fine-tuning the PTN via the RN, the resulting CBN learns from a good exposure reference point derived from pre-training rather than from scratch.

In various implementations, the PTN is refined to generate the CBN based on rewards assigned to a large set of exposure bracketed training images (e.g., Algorithm 1, as discussed in Section 2.6.1). The training images used for this purpose are obtained from one or more instances of the particular camera model or type for which the PTN was trained. In various implementations, the PTN is optionally applied to predict the exposure values that are then used by camera to capture the training images that will be used to refine the PTN. See FIG. 6 and the associated discussion for this use of the PTN.

2.4.1 Data Acquisition:

In order to accurately mimic exposure control behavior of the native camera, including any existing semantic-aware exposure control features of that native camera, it is useful to collect well-distributed data under various lighting conditions and scene content. For example, in various implementations, multiple videos (e.g., sequential frames over short time periods) are captured by the camera being used in order to obtain as many examples as possible (or feasible) that associate particular types of scenes (e.g., faces, people, objects, etc., indoors and outdoors, and under various lighting conditions and backgrounds) with exposures that are automatically set by the camera. Such data provides an accurate representation of how native exposure control behaves under changing lighting conditions and changing scene semantics. Consequently, obtaining these types of training sets ensures that the resulting PTN will determine exposures in a way that closely mimics the particular native camera for which the PTN (and subsequently the CBN) is being trained.

For example, one way in which such data may be obtained is to simply use the native camera to capture videos (i.e., sequences of multiple frames with automated exposure settings for each frame) over a wide range of exposures and scene semantics. For example, in various implementations, an exposure bracketing capture app was applied on various native cameras to record scene appearance over a wide range of exposures. In a tested implementation, this exposure bracketing capture app first called the native camera auto-exposure to let it converge to a steady-state, whose $EV_0$ naturally serves as pre-training ground truth. The exposure of the native camera was then adjusted to intentionally capture a bracketing set of images from under-exposed to over-exposed by uniformly sampling $EV^i$ from $-8$ to $+8$, for example.

For any image $I_i$ with $EV_i$ in the set, a computation can be made as to how much to correct the exposure, namely, $\Delta_{EV}^i = EV_0 - EV_i$. If $\Delta_{EV} = 0$, then it means the corresponding frame has converged to steady-state. Let doublet $S_i = \{I_i, \Delta_{EV}\}$ be the information for each frame. Then, the whole training dataset $S = S_0, S_1, \ldots, S_N$ consists of N such doublets from all bracketing sets. Once the training dataset S is produced using these or other techniques, pre-training of the PTN can then be achieved as an automated supervised learning task on that training dataset.

2.4.2 KL-Divergence Loss:

In principle, it is possible to directly train a regression network (e.g., the PTN and/or the RN) to fit dataset S. However, to facilitate contextual bandit learning, in various implementations, training is cast as a probability distribution fitting problem, which can be efficiently trained using KL-divergence loss (or other divergence technique). Specifically, in various implementations, the network is trained to output a probability vector P (e.g., within dashed boxes 230 and 250 in FIG. 2) that represents the likelihood of selecting each action that corresponds to a specific $\Delta_{EV}$. Therefore, to train the network using KL-divergence loss, the ground-truth $\Delta_{EV}$ is converted into a probability vector Q. In various implementations, this is accomplished by partitioning the space of $\Delta_{EV}$ into multiple bins (e.g., 11 bins, 25 bins, etc., in a tested implementation), each corresponding to an action. For example, assuming 25 bins and a range of $A=[-4, \ldots +4]$ this corresponds to a step size of 0.32. However, larger or smaller step sizes (i.e., fewer or larger number of bins) may be used, if desired, depending on the capabilities of the camera. If the derived $\Delta_{EV}$ is outside this range, it is simply mapped to its nearest bin. Consequently, the probability of each action in Q can be defined as:

$$Q_j = \frac{\exp-(\Delta_{EV} - A_j)^2}{\sum_{j=1}^{25}\exp-(\Delta_{EV} - A_j)^2} \qquad \text{Equation (3)}$$

Let F be the mapping function such that $\Gamma(I_i) \approx \Delta_{EV}^i$. In various implementations, a deep convolution network (shown within dashed boxes 210 and 240 in FIG. 2) is used to model the mapping. $\Gamma(I_i)$ is chosen as the value of the corresponding bin which has the largest probability value output from the network action layer (shown within dashed boxes 230 and 250 in FIG. 2).

2.4.3 Smooth Regularization:

Intuitively, training using a history of frames with ($I_i$, $I_{i-1}, \ldots, I_{i-k}$, k>1) through sequential-based classification is expected to be beneficial. Unfortunately, experimental results with a particular native camera were not supportive of this assumption. One possible reason is the particular native camera does not determine the exposure adjustment based on a sequence of the previous frames. So, training using sequences may well add noise in the form of earlier states. Nevertheless, it may be desirable to have exposure changes that are approximately as temporally smooth as those generated by the native camera system. Consequently, to achieve this, a smoothness regularization term (based on a bilateral filter) can be added to the loss function. The following is then minimized:

$$L(S,\Gamma) = L\_KL + C*L\_smooth \qquad \text{Equation (4)}$$

where $C=0.01$ and $L_{KL}$ is the standard KL divergence loss which measures the distance between two probability distributions P and Q. $L_{smooth}$ is a regularization term defined as:

$$L_{smooth} = \frac{1}{NM}\sum_{i=0}^{N}\sum_{j=0}^{M}\varpi(I_i, I_j)(\Gamma(I_i) - \Gamma(I_j))^2 \qquad \text{Equation (5)}$$

where M=6 (although M can be set to a higher or lower value, if desired) is the number of sampled temporal neighboring frames for each frame within the same bracket. $\bar{\omega}(I_i, I_j)$ is defined as:

$$\varpi(I_i, I_j) = \exp\left(-\frac{(I_i - I_j)^2}{2 * \sigma_1^2} - \frac{(i-j)^2}{2 * \sigma_2^2}\right) \quad \text{Equation (6)}$$

Empirically, adding the smoothness term helps to suppress temporal oscillatory behavior.

However, mimicking the native camera's exposure control behavior via the PTN alone may not be sufficient to improve exposure of the resulting image output to desired levels, depending on the firmware metering capabilities of the camera to correlate scene content with the appropriate exposure under various lighting conditions. Consequently, in various implementations, the gap between firmware control of the camera and scene semantic information can be further bridged through refinement of the PTN via the aforementioned machine-learned RN and contextual bandit learning, as discussed in further detail in Sections 2.5 and 2.6 of this document, to further improve exposure control prediction capabilities of the Exposure Controller.

2.5 Hardware-Independent Reward Network (RN):

In general, the reward network (RN) is trained on a large collection of labeled or scored images (which optionally include high dynamic range (HDR) images), each of which can be synthetically exposure bracketed to construct a corresponding set of images containing fine-grained exposure bracketing information. Once trained, the RN can then be applied to refine the PTN to construct the CBN. Advantageously, the RN is hardware independent (e.g., applicable to arbitrary camera types or models) and may itself be applied to predict semantic-aware exposure values for arbitrary cameras. Further, to ensure that the trained CBN is implicitly responsive to scene semantics (e.g., faces or objects against bright or dark backgrounds, indoor scenes, outdoor scenes, etc.), the training set for learning the RN is constructed to include as many examples of each particular type of scene semantics as possible or feasible. Advantageously, this enables the trained CBN to implicitly respond to scene semantics without actually evaluating scenes to determine scene content, thereby significantly improving performance of the CBN for real-time exposure control operations.

In supervised learning, the ground-truth $\Delta_{EV}$ can be associated with a given image/(selected within a bracketed set). However, for on-line learning, this is not possible in cases where only one image can be captured at any time by a particular camera. As such, given the current image and a specific $\Delta_{EV}$, at the next time step, a new image is obtained along with its associated reward based on exposure quality. This information can then be applied to enable CBN to learn how to predict an appropriate $\Delta_{EV}$ through the reward signals.

One way of providing such reward signals is for a user (or some reviewer) to interactively provide the reward for each captured image. However, while feasible, such a process can be tedious when capturing large training datasets. As such, in various implementations, this process is automated by training a regression network that simulates the human reward signal for any image. This network, referred to herein as the aforementioned reward network (RN), outputs a measure of human preference (reward) for exposure given the image. In various implementations, this reward is used by the CBN for computing the loss function. In other words, the RN is applied to refine the aforementioned PTN to generate the CBN. Advantageously, because the RN correlates image appearance with exposure, it is firmware independent with respect to various native cameras. As such, a single RN can be applied to refine the PTN (and thus the CBN) associated with multiple different camera models and types.

In various implementations, the reward for each image is set in the range of [0,1], although other reward scales may be applied for this purpose. For example, assuming this range, in various implementations, an over- or under-exposed image receives a small reward (e.g., <1), with the reward decreasing as the quality or acceptability of the exposure decreased or worsened, while a perfectly exposed image would receive the largest reward (e.g., =1). Then, if image A is considered as over-exposed compared to image B, the RN, once properly trained, will return a lower reward value for A than for B. In various implementations, real exposure bracketing sets are applied to train the RN. In similar implementations, a simpler and more scalable approach is applied to train the RN by synthesizing the required dataset as described in Section 2.5.1.

2.5.1 Synthetic Exposure Bracketing:

In a tested implementation, a dataset for training the RN was synthesized from a random sampling of images of particular scene semantic types. For example, if it is desirable to ensure that faces are captured with good contrast regardless of lighting conditions, then large numbers of images with faces under various lighting conditions will be included in the training data for learning the RN. Similarly, if it is desirable to ensure that outdoor scenes in various lighting conditions are captured with good contrast, then large numbers of outdoor scenes with various lighting conditions will be included in the training data for learning the RN. In other words, the RN is trained using large numbers of examples of images that include whatever semantics (e.g., faces, objects, scenery, etc.) may be of interest.

For example, in this tested implementation, a total of 10,000 images covering the desired scene semantic types were randomly sampled from multiple different photo collections captured by a variety of native cameras. Clearly, more or fewer images may be used for this purpose. Low-quality images (e.g., very blurry and very dark images) and near-duplicates were removed from this training data set, leaving about 5,000 images. Removal of low-quality images may be achieved either via manual human review of each image or by known techniques for detecting images having poor focus or poor contrast. Again, more or fewer images can be used for training.

For each image I, over- and under-exposed images were automatically generated to complete corresponding bracketing sets for each image by scaling the intensity value. For example, in a tested implementation, 24 synthetic exposures were generated, corresponding to 24 scaling factors. However, more or fewer scaling factors and more or fewer synthetic images may be used to generate the bracketing set for each image. There is no requirement that each step of the scaling factor exactly correspond to $\Delta_{EV}$, because the intent is to approximately mimic different degrees of over- and under-exposure.

For each bracket set, multiple human reviewers select a subjectively "best" exposure (i.e., the image having an exposure preferred by the particular reviewer) from the corresponding bracketing set. The resulting selections from the human reviewers is then consolidated by taking the average scaling factor of those users for each image. The result of this human review process is considered as the ground-truth, denoted as $S_{gt}^i$, for bracketing set i. The reward $r_t(x_j^i)$ for each image $x_j^i$ (with scale $S_j^i$ within set i is defined as the normalized similarity between its scale and $S_{gt}^i$ is given by Equation (7):

$$r_t(x_j^i) = \frac{\exp(S_{gt}^i - S_j^i)^2}{\sum_{k=1}^{24} \exp(S_{gt}^i - S_k^i)^2} \qquad \text{Equation (7)}$$

The above discussion regarding the use of multiple human reviewers for selecting a preferred exposure from each exposure-bracketed training data set assumes that the reward for exposure is person-independent. However, rather than using multiple human reviewers, the RN, and thus the CBN, is optionally personalized to an individual user (or a particular group of one or more human experts) by simply training the RN with selections of preferred images from the bracketing sets from that individual user (or the particular group of one or more human experts). Regardless, the RN is learned to encode preferences of human reviewers with respect to image exposure for a variety of scene semantics under a variety opf lighting conditions. This enables the RN to be applied to guide the subsequent CBN learning (via refinement of the PTN) to predict improved exposure adjustments.

2.5.2 Training as a Regression Network:

Given the datasets of bracketed images and human selections, in various implementations, the RN is trained as a regular regression network. However, other machine-learning techniques may be applied to the scored dataset constructed by the human reviewers. In the case of a regression network, the final output layer is a single node representing the regressed reward. In various implementations, Euclidean distance is applied as a loss function to ensure that the output is close enough to the ground-truth. Other loss functions and techniques, such as, for example, L1 norm loss, may also be applied for this purpose. In tested implementations, acceptable convergence of the RN was observed after approximately 20 epochs.

2.6 Contextual-Bandit Learning:

In general, contextual-bandit learning is a simplified setting of the full reinforcement learning family, where the reward provided by the environment is intermediate. Typically, contextual-bandit learning uses human interaction to provide the feedback (or reward), such as online article recommendation. However, given the number of images used for training the PTN, RN and the CBN, a direct human reward for each image is possible, though cumbersome. Consequently, in various implementations, the RN is applied to act as substitute human feedback for guiding CBN learning via refinement of the PTN. In general, the absolute difference (L1 norm) value between the predicted reward and the ground-truth is measured as the fitting error.

Contextual-bandit learning is widely used for many online decision-making problems such as online advertising and marketing optimization. At each step t of the online learning, the agent first observes contextual information $x_t$ which intrinsically correlates with some of the actions. It then chooses an action $a_t$ from an action pool A according to the current control policy $\pi(x_t)$ so that $a_t = \pi(x_t)$. The agent receives a reward $r_t(a_t)$ as a feedback from the environment, and $\pi$ is then refined to reflect the reward.

For example, consider an online advertising recommendation system. In this example, let $x_t$ be the user profile and/or cookie information that may indicate user preferences. Each action represents one specific advertisement from a large pool. If the user clicks one of the presented advertisements, then the agent receives a reward. However, the agent has zero knowledge about any non-clicked advertisements. In general, contextual bandit learning selects a policy $\pi \in \Pi$ so that the reward associated with an optimal action selection strategy is maximized:

$$R_\pi = \mathop{\mathrm{argmax}}_{\pi \in \Pi} \sum_{t=1}^{T} \exp - (r_t(\pi(x_t)) - r_t(a_t))^2 \qquad \text{Equation (8)}$$

2.6.1 Problem Formulation:

In contrast to the advertisement-based example discussed above, in various implementations, the Exposure Controller applies a customized contextual-bandit learning process to solve the auto-exposure problem. Here, each action is defined as the amount of exposure adjustment ($\Delta_{EV}$), and the reward is defined smoothly in terms of the exposure quality returned by the RN. Similar to the supervised pre-training, in a tested implementation, 25 "actions" were defined within the range [−4.0, . . . , 0, . . . , +4.0] using a step size of 0.32. However, more or fewer actions and larger or smaller step sizes may be applied for this purpose. Given the current captured frame $x_t$ at time t, the exposure control policy $\pi(x_t)$ selects an action $a_t$ that corresponds to a specific exposure adjustment for capturing frame $x_{t+1}$. The term $\pi(x_t)$ is represented in the form of a deep convolution neural network (e.g., the CBN), which is fine-tuned from the PTN via the RN using reinforcement learning techniques, such as, for example, policy gradient methods, as illustrated in FIG. 2.

One factor that impacts the performance of $\pi(x_t)$ is the trade-off between "exploitation" and "exploration". More specifically, in this context, exploitation refers to the greedy action $a_t^* = \mathrm{argmax}_{a_t} r_t(a_t)$ at each step based on the current knowledge, while exploration consists of probing in a global search space in an attempt to find other promising solutions that are yet to be refined. Exploitation aims to maximize reward at each step, and hence is a local process. Exploration improves the estimation of non-greedy actions, and it may generate a larger total reward in the long run.

One technique for implementing the trade-off idea is generally referred to as the greedy method. In this method, at each time step, instead of always selecting the best action, with a small probability E, this greedy method selects randomly from all the other actions with equal probability. In a tested implementation, this technique was applied with a fixed ε=0.2. However, larger or smaller values of ε may be applied for this purpose.

During training, at each time step t, one action and its reward can be seen. Consequently, back propagation in the learning process is then performed based on that one action. Because each reward $r_t(a_t)$ returned by RN is within [0,1], assuming the reward range discussed in Section 2.5, sigmoid was chosen as the activation function. However, other activation functions may be applied for this purpose. The activation function outputs the selection probability value (denoted as $p_{a_t}$) for each action $a_t$ in the action probability layer, with $p_{a_t} \in [0,1]$. The loss function for $x_t$ is defined as a standard cross-entropy loss:

$$L = -r_t(a_t) * \log(p_{a_t}) - (1 - r_t(a_t)) * \log(1 - p_{a_t}) \qquad \text{Equation (9)}$$

The gradients can be back propagated to weights connected with the corresponding action $a_t$. One example of the on-line training procedure is listed in Algorithm 1 (provided below). One advantageous feature of this design is that the CBN can be easily integrated into the feature extraction layers and learned jointly with the underlying feature layers through back-propagation. This allows the CBN to be learned in an end-to-end fashion as shown in FIG. 2. In a tested implementation, a standard stochastic gradient descent (SGD) method was applied to perform the fine-tuning with a small learning rate (e.g., 0.00001). However, other learning techniques may be applied for this purpose.

---

Algorithm 1: Contextual-Bandit Training Procedure

1. Initialize the policy network parameters with zero mean Gaussian
2. for t = 1, ..., T: do
3.     Obtain image $I_t \in I$, which serves as contextual information
4.     Agent (or learner) selects an action $a_t$ from A
5.     Obtain image $I_{t+1}$ using camera setting defined in $a_t$
6.     RN gives reward $r_t(a_t)$ based on $I_{t+1}$
7.     Perform SDG training on the PTN according to Equation (9)
8. end for
9. Output: Trained policy network $\pi^*$ (i.e., the aforementioned CBN)

---

2.6.2 Off-Line Simulation:

In view of on-line contextual bandit learning techniques, the auto-exposure processes provided by the Exposure Controller can, in principle, be learned in an on-line fashion on the target device (e.g., a particular camera type or model). In this case, both the PTN and the RN would be deployed in the device. The camera hardware would then be used to capture an image based on each selected action, and the image-exposure information would be sent to the RN to get the reward. This could be accomplished, for example, by directing a user to physically hold the camera to collect large amounts of data with a variety of scenes and lighting conditions, and to provide the feedback or scores regarding the user's perceived exposure quality of those images. The CBN would then be updated after some number of new images have been captured and scored by the user. While this process is certainly a viable possibility, this type of on-line learning process would typically take a long time to evaluate, and the learner may also take a long time to converge on the CBN.

As such, in various implementations, off-line simulation was applied for training purposes. As with on-line learning, an action results in the camera capturing a real image. To conduct off-line simulation, all the images that correspond to each potential different exposure adjustment $\Delta_{EV}$ are captured in advance, and then fed into the RN for measuring exposure quality. Ideally, these are images for accurate feedback purposes. As with the supervised pre-training step, in various implementations, the same exposure bracketing capture process can be applied to collect a variety of scenes under different lighting conditions, with additional focus on cases where the native camera tends to either under-expose or over-expose images. There are two basic differences. First, during supervised pre-training, the native camera exposure was applied as ground-truth, whereas the CBN training step used the reward returned by RN. Second, in CBN training, at every time step, only one exposure bracketing set is processed (by selecting the action output and measuring the reward), followed by performing propagation through the same action.

Further, because simulation can be performed for on-line learning, after one epoch (one pass of the entire training set), the same training images could be revisited in the next epoch. However, these same training images would then be treated as different examples because their time steps are different, which mimics the on-line learning procedure.

2.7 Optional Attention Model:

With respect to application of the Exposure Controller to currently captured images for predicting exposure settings for subsequently captured images, the Exposure Controller generally considers the entire image when predicting those exposure settings. However, in various implementations, rather than consider the entire current image, the Exposure Controller instead applies an attention model or the like that considers one or more sub-regions of the current image. For example, in various implementations, the Exposure Controller applies the attention model to perform a central crop of the current image, e.g., thirty percent of the image drawn from the center of the image. The Exposure Controller then applies one of the models (e.g., the PTN, RN or CBN) to the cropped image content to predict the exposure settings for capturing the next image. Other techniques for determining user focus, e.g., user eye tracking, scene motion detection, etc., may also be applied by the attention model to determine or identify one or more sub-regions of the current image to be processed by the Exposure Controller for predicting the exposure settings for the next image.

2.8 Additional Considerations:

The following paragraphs discuss the performance for pre-training (i.e., the PTN), the RN, and the CBN. It has been observed that the PTN successfully mimics camera firmware control of exposure while the CBN further improves exposure quality by implicitly considering scene semantics based on human exposure preferences for various scene semantics. Similarly, the RN, while not explicitly mimicking camera firmware, successfully predicts exposure settings that improve exposure quality for arbitrary cameras by implicitly considering scene semantics.

In a tested implementation, the image data used in training the RN, PTN and CBN, was obtained by capturing a large number of videos that feature changes in illumination (e.g., dark to bright, bright to dark, and intermediate brightness level changes) while recording the exposure values in time. In addition, this training image data may further include captured videos for situations where the native camera tends to produce suboptimal exposure (e.g., for backlit scenes). In addition, the resulting training datasets may include coverage of different scenes, e.g., indoor, outdoor, and different lighting conditions, as well as different scene semantics in some or all of these settings.

3.0 Operational Summary of the Exposure Controller:

The processes described above with respect to FIG. 1 and FIG. 2, and in further view of the detailed description provided above in Sections 1 and 2, are illustrated by the general flow diagrams of FIG. 3 through FIG. 12. In particular, FIG. 3 through FIG. 12 provide exemplary architectural flow diagrams that summarize the operation of some of the various implementations and features of the Exposure Controller. FIG. 3 through FIG. 12 are not intended to provide an exhaustive representation of all of the various implementations of the Exposure Controller described herein, and the implementations represented in these figures are provided merely for purposes of explanation and discussion.

Further, any boxes and interconnections between boxes that may be represented by broken or dashed lines in FIG. 3 through FIG. 12 represent optional or alternate implementations of the Exposure Controller described herein, and any or all of these optional or alternate implementations, as described below, may be used in combination with other alternate implementations that are described throughout this document.

Figure 3:
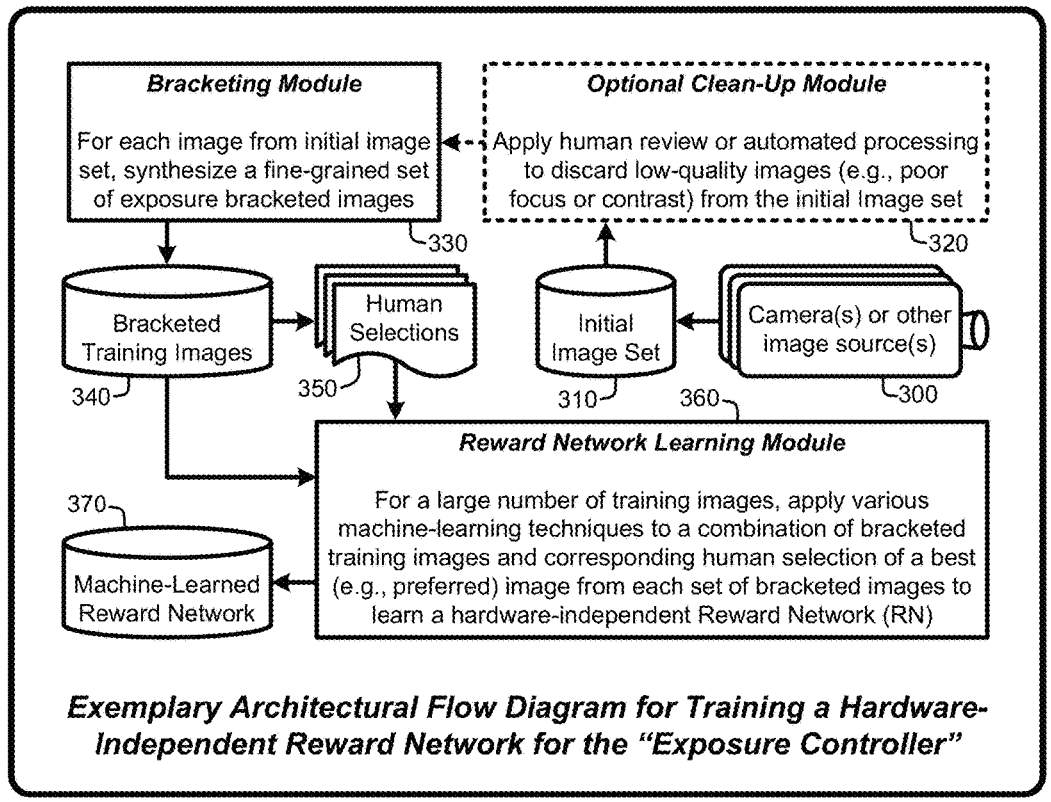
FIG. 3 provides an exemplary architectural flow diagram for training a hardware-independent reward network (RN), as described herein.

In general, as illustrated by FIG. 3, one or more arbitrary cameras or other image sources 300 are applied to obtain an initial image set 310 comprising a large number of images. As mentioned, these images, because they will be used to train the reward network (RN), are selected to include as many examples of particular types of scene semantics as possible or feasible.

In various implementations, an optional clean-up module 320 is applied to the initial image set 310 to discard low quality images. More specifically, the initial image set 310 is optionally processed by applying human review or known automated processing techniques to discard low-quality images such as, for example, images exhibiting poor focus, images exhibiting poor contrast levels in one or more portions of the images, etc.

Next, whether or not the image set 310 has been reduced via the optional cleanup module 320, the images in the image set are provided to a bracketing module 330. For each of those images, the bracketing module 330 synthesizes a set of fine-grained of exposure bracketed training images 340. These sets of bracketed training images 340 are then passed to one or more human reviewers that select a preferred image (in terms of exposure) from each set. The human selection for each set in the bracketed training images 340 are then passed to a reward network learning module 360 along with the entire set of bracketed training images 340.

In general, the reward network learning module 360 applies various machine-learning techniques to a combination of the bracketed training images 340 and the corresponding human selections to learn a hardware-independent reward network (RN) 370. This machine learned reward network 370 is then available for use in training the aforementioned CBN for particular camera models or types. In addition, as mentioned, the reward network 370 may also be used as a standalone model to predict semantic-aware exposure settings in real time for use by the Exposure Controller.

Figure 4:
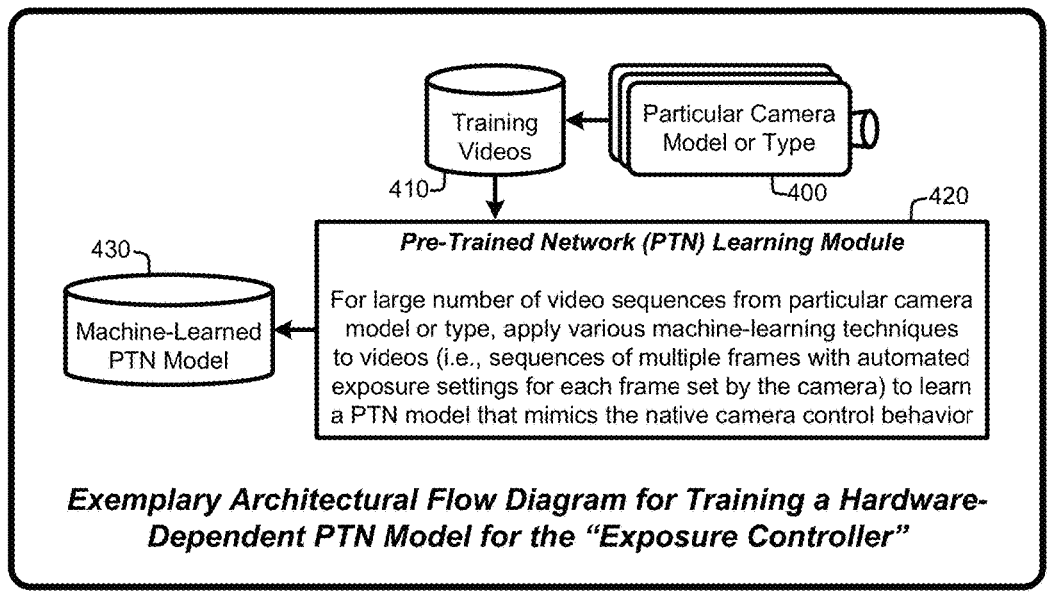
FIG. 4 provides an exemplary architectural flow diagram for training a hardware-dependent pre-trained network (PTN) that mimics exposure control settings of a particular camera model or type, as described herein.

Next, as illustrated by FIG. 4, in various implementations, one or more cameras 400 of a particular model or type are applied to obtain a large number of training videos 410. In various implementations, video sequences, rather than merely individual images, are obtained because this allows an inherent modeling of transitions of exposure values from one frame to the next as lighting conditions, scene dynamics and/or scene semantics may change. Given the configuration of typical digital cameras, each of the image frames of each training video 410 inherently includes the exposure values applied by the camera(s) 400 to capture those image frames. The training videos 410 (and the exposure information for each frame) are then provided to a pre-trained network (PTN) learning module 420. In general, the PTN learning module 420 applies various machine-learning techniques to the image frames to learn a PTN model 430 that mimics the native exposure control behavior, including any existing semantic-aware exposure control features, of the particular camera model or type from which the training videos were obtained.

Figure 5:
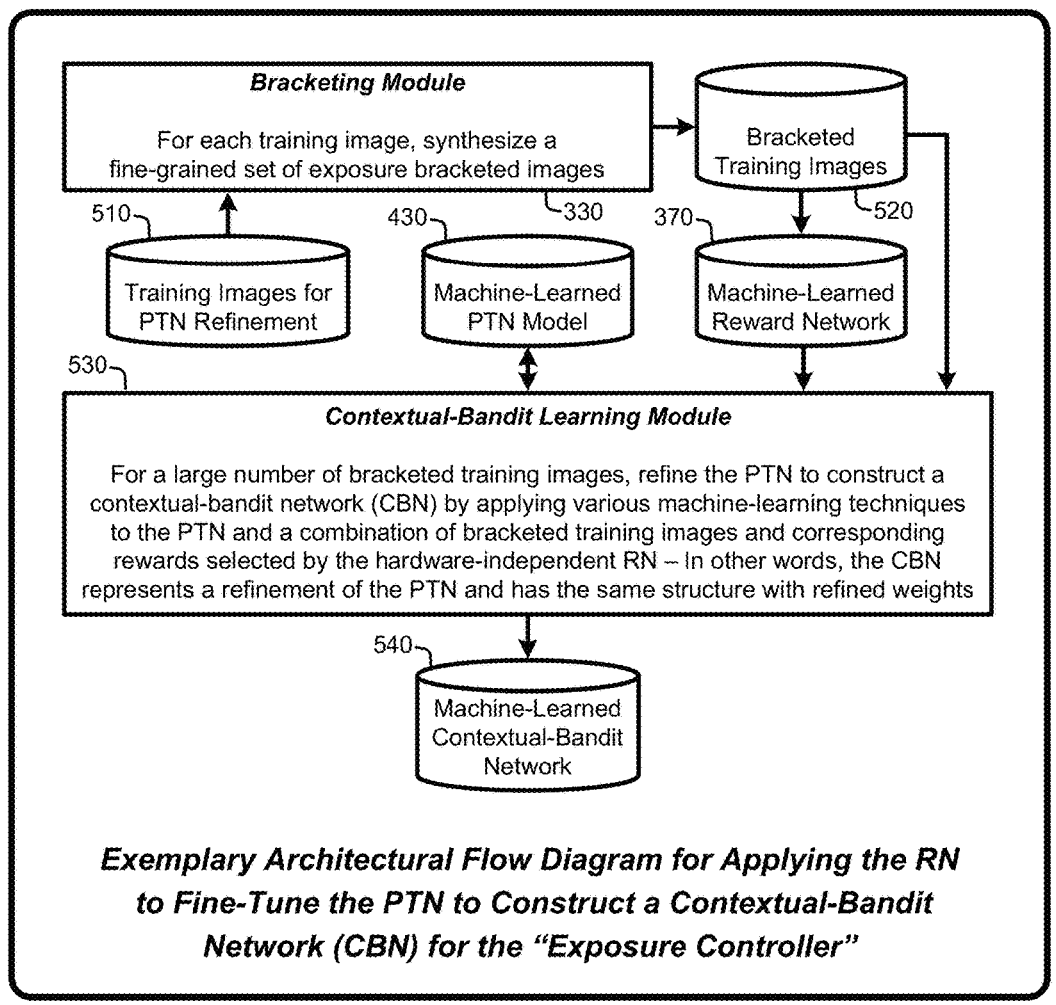
FIG. 5 provides an exemplary architectural flow diagram for applying the RN to fine-tune the PTN to construct a contextual-bandit network (CBN) for the Exposure Controller, as described herein.
Figure 6:
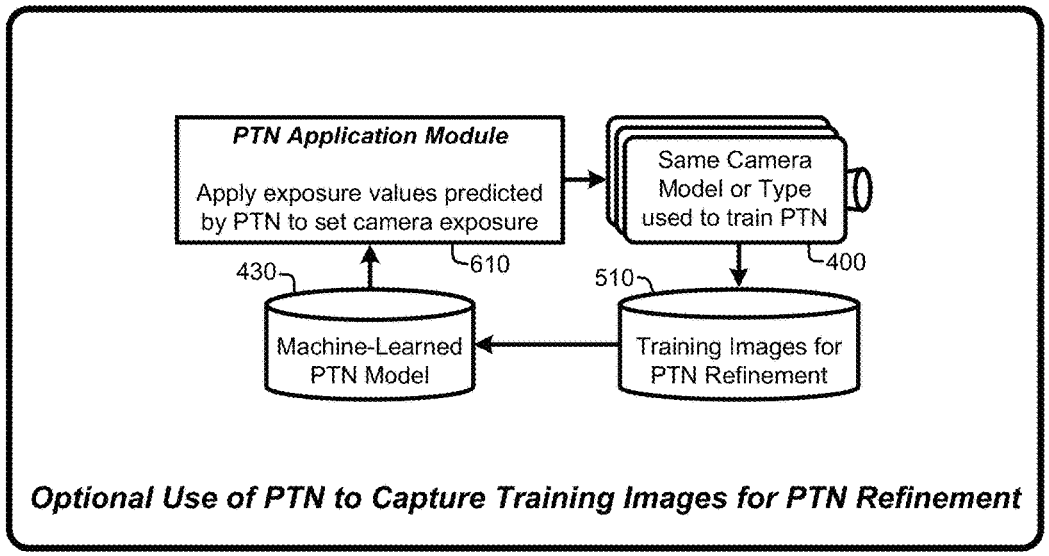
FIG. 6 provides an exemplary architectural flow diagram that shows optional use of the PTN to obtain the training images for fine-tuning the PTN as illustrated by FIG. 5, as described herein.

Next, as illustrated by FIG. 5, a large set of training images 510 for PTN refinement are received. In various implementations, these training images 510 are obtained from the same camera type or model that was applied to capture the images used to train the PTN (see FIG. 4). In general, these images 510 may be obtained using the exposure control functionality integral to the camera. However, as illustrated by FIG. 6, discussed below, the PTN may optionally be applied to predict and set exposure values for capturing the training images 510.

Regardless of how the training images 510 were obtained, as illustrated by FIG. 5, these training images are provided to a bracketing module. The bracketing module 330 described with respect to FIG. 3 may be reused here. In particular, in the context of FIG. 5, for each training image 510, the bracketing module 330 synthesizes a fine-grained set of exposure bracketed images 520. These sets of exposure bracketed training images 520 are then passed to the machine learned reward network 370 described with respect to FIG. 3. As illustrated by FIG. 5, the machine learned reward network 370 then assigns a reward value to each image in each set of bracketed training images 520 and passes those reward values to a contextual-bandit learning module 530. In addition, the entire set of bracketed training images 520 is also passed to the contextual-bandit learning module 530.

The contextual-bandit learning module 530 then constructs a machine-learned contextual-bandit network (CBN) 540 by applying various machine learning techniques to refine the machine-learned PTN model 430 based on the reward values and corresponding bracketed training images 520. In other words, the CBN represents a refinement of the PTN and has the same structure with refined (e.g., different) weights.

As mentioned above, FIG. 6 illustrates the use of the PTN to capture training images 510 for PTN refinement when constructing the CBN, as illustrated by FIG. 5. More specifically, this is accomplished by applying the same camera 400 model or type used to initially train the PTN to capture a training image 510. This image 510 is then passed to the machine-learned PTN model 430, which processes that image to make a real-time prediction of exposure values for a next image to be captured by the camera 400. A PTN application module 610 then applies these predicted exposure values to set camera 400 exposure values. The camera 400 then captures a next training image 510 using the predicted exposure values. This loop (400 to 510 to 430 to 610 to 400) then continues for as long as desired to capture as many training images 510 as desired.

Figure 7:
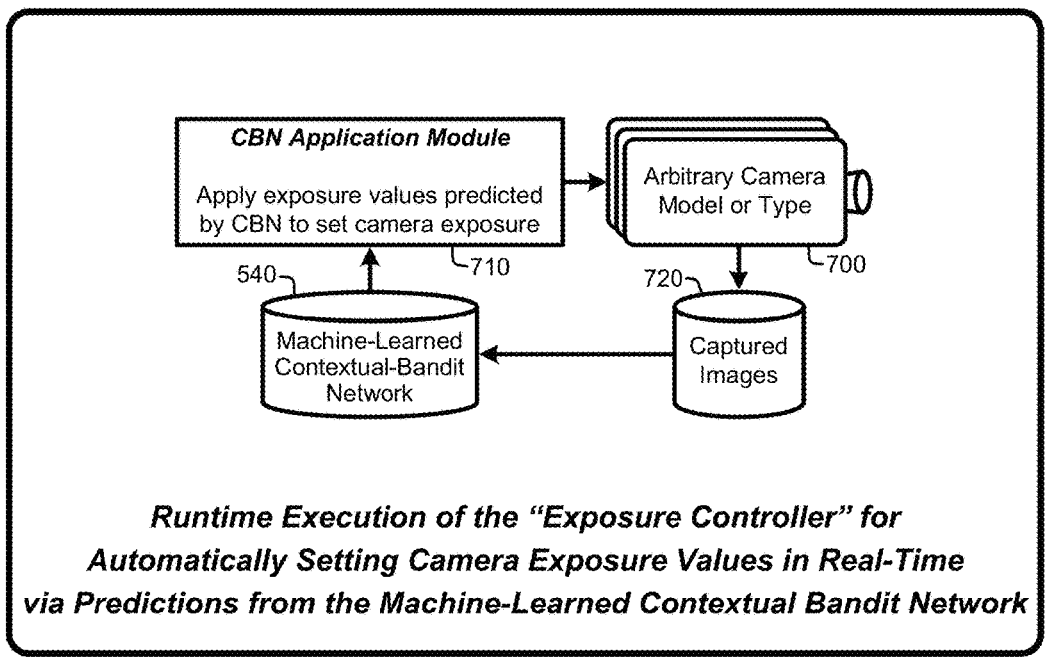
FIG. 7 provides an exemplary architectural flow diagram that illustrates runtime execution of the Exposure Controller for automatically setting camera exposure values in real-time via predictions from the machine-learned CBN, as described herein.

As illustrated by FIG. 7, once the machine-learned CBN 540 has been learned through refinement of the PTN (see FIG. 5), the CBN may then be applied for use in real-time control of exposure settings for arbitrary scenes using an arbitrary camera model type 700 (or the same camera model or type used to initially train the PTN). In particular, as soon as camera 700 obtains an image, that image 720 is then passed to the machine-learned CBN 540, which processes that image to make a real-time prediction of exposure values for a next image to be captured by the camera 400. A CBN application module 710 then applies the predicted exposure values to set camera 400 exposure values. The camera 700 then captures a next image 720 using the predicted exposure values. This loop (700 to 720 to 540 to 710 to 700) then continues for as long as desired to capture as many images 720 as desired, with predictions and setting of exposure values occurring in real-time. Optionally, a delay of zero or more frames is applied prior to capturing the next frame with the predicted exposure settings to account for any latency in camera firmware response times.

Figure 8:
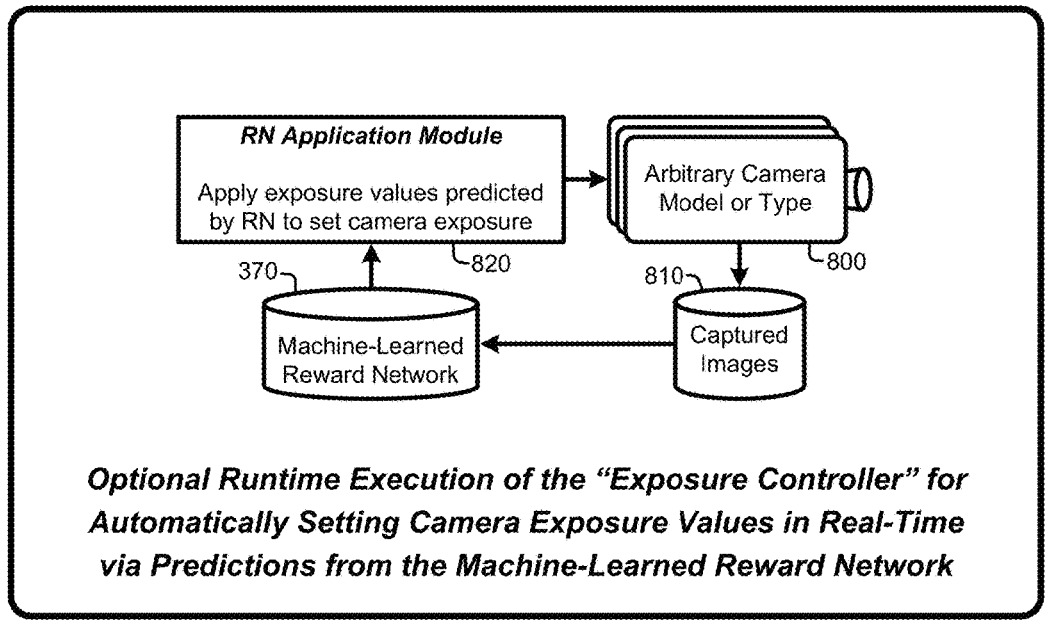
FIG. 8 provides an exemplary architectural flow diagram that illustrates runtime execution of the Exposure Controller for automatically setting camera exposure values in real-time via predictions from the machine-learned PTN, as described herein.

As illustrated by FIG. 8, in various implementations, the machine-learned reward network 370, described with respect to FIG. 3, may optionally be applied for use in real-time control of exposure settings for arbitrary scenes using an arbitrary camera model or type 800. In particular, as soon as camera 800 obtains an image, that image 810 is then passed to the machine-learned reward network 370, which processes that image to make a real-time prediction of exposure values for a next image to be captured by the camera 800. An RN application module 820 then applies the predicted exposure values to set camera 800 exposure values. The camera 800 then captures a next image 810 using the predicted exposure values. This loop (800 to 810 to 370 to 820 to 800) then continues for as long as desired to capture as many images 810 as desired, with predictions and setting of exposure values occurring in real-time. Optionally, a delay of zero or more frames is applied prior to capturing the next frame with the predicted exposure settings to account for any latency in camera firmware response times.

Figure 9:
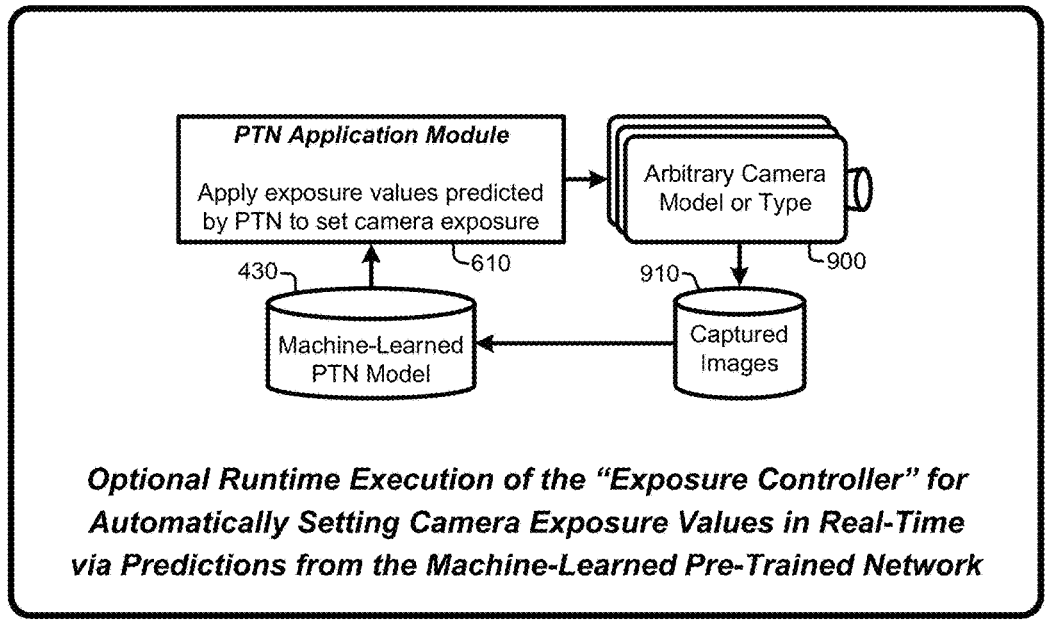
FIG. 9 provides an exemplary architectural flow diagram that illustrates runtime execution of the Exposure Controller for automatically setting camera exposure values in real-time via predictions from the machine-learned RN, as described herein.

As illustrated by FIG. 9, in various implementations, the machine-learned PTN model 430, described with respect to FIG. 4, may optionally be applied for use in real-time control of exposure settings for arbitrary scenes using an arbitrary camera model or type 900. In particular, as soon as camera 900 obtains an image, that image 910 is then passed to the machine-learned PTN model 430, which processes that image to make a real-time prediction of exposure values for a next image to be captured by the camera 900. The PTN application model 610, described with respect to FIG. 6, then applies the predicted exposure values to set camera 900 exposure values. The camera 900 then captures a next image 910 using the predicted exposure values. This loop (900 to 910 to 430 to 610 to 900) then continues for as long as desired to capture as many images 910 as desired, with predictions and setting of exposure values occurring in real-time. Optionally, a delay of zero or more frames is applied prior to capturing the next frame with the predicted exposure settings to account for any latency in camera firmware response times.

Figure 10:
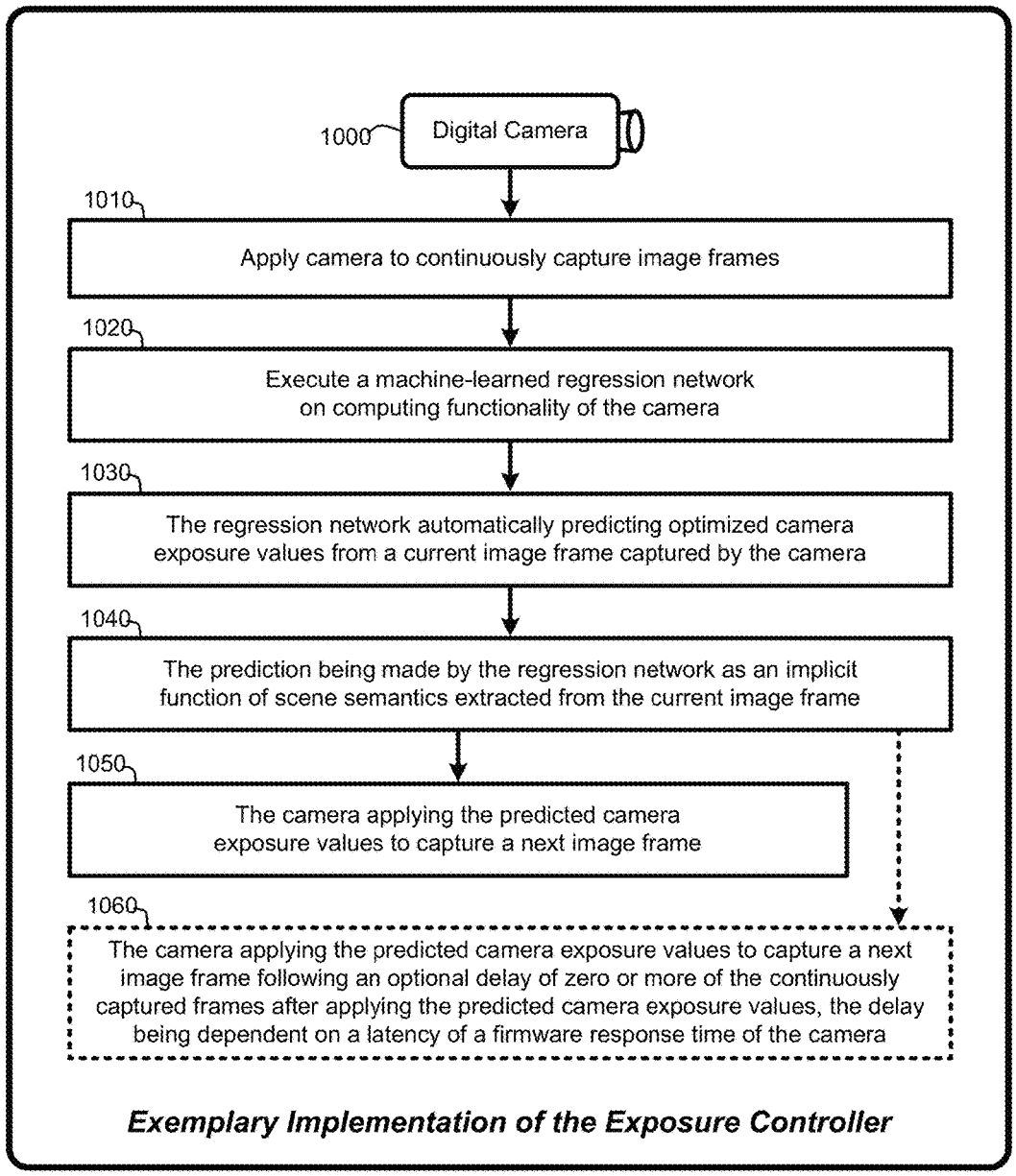
FIG. 10 illustrates a general system flow diagram that illustrates exemplary techniques for effecting various implementations of the Exposure Controller, as described herein.

In general, as illustrated by FIG. 10, in various implementations, the Exposure Controller begins operation by applying a digital camera 1000 to continuously capture (1010) image frames. In addition, the digital camera is configured to execute (1020) a machine-learned regression network on computing functionality of the camera. The regression network automatically predicts (1030) optimized camera exposure values from a current image frame captured by the camera. Further, the prediction is made by the regression network as an implicit function (1040) of scene semantics extracted from the current image frame. The camera then applies (1050) the predicted camera exposure values to capture a next image frame. In various implementations, the camera applies (1060) the predicted camera exposure values to capture the next image frame following an optional delay of zero or more of the continuously captured frames after applying the predicted camera exposure values, the delay being dependent on a latency of a firmware response time of the camera.

Figure 11:
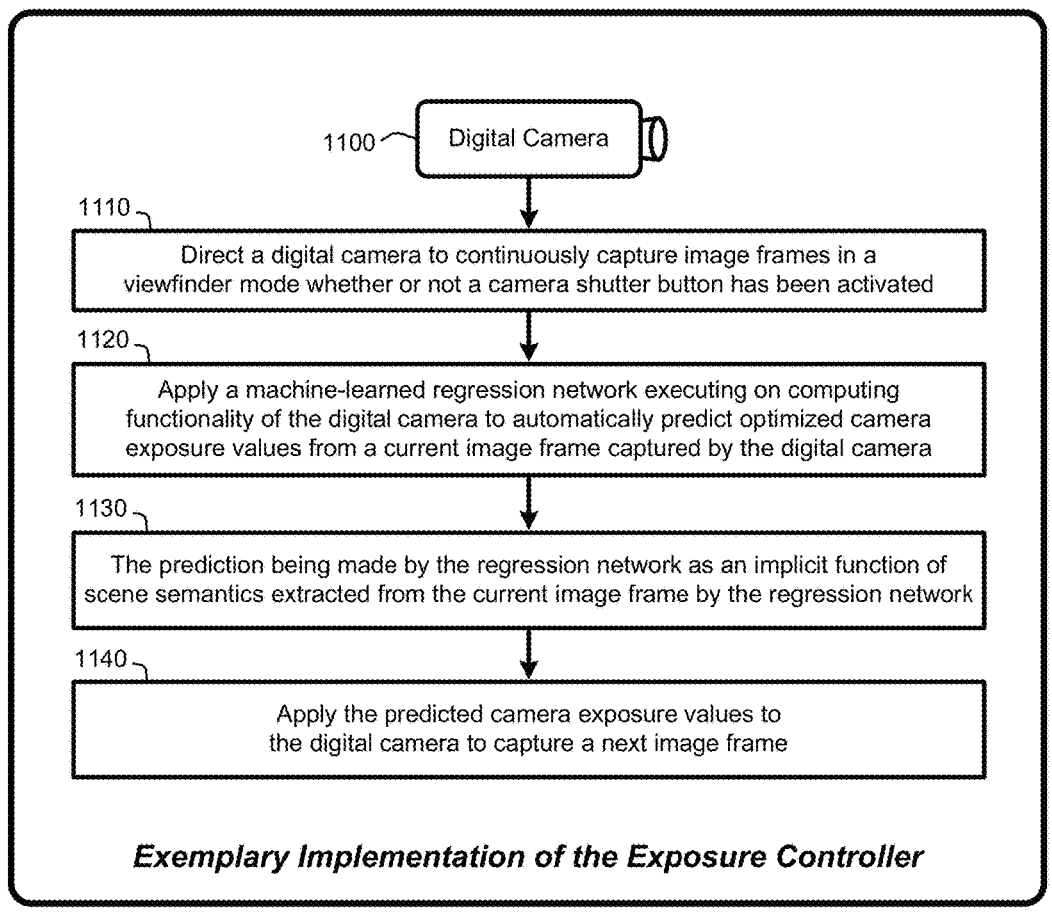
FIG. 11 illustrates a general system flow diagram that illustrates exemplary techniques for effecting various implementations of the Exposure Controller, as described herein.

Similarly, as illustrated by FIG. 11, in various implementations, the Exposure Controller begins operation by directing (1110) a digital camera 1100 to continuously capture image frames in a viewfinder mode whether or not a camera shutter button has been activated. In addition, the Exposure Controller applies (1120) a machine-learned regression network executing on computing functionality of the digital camera to automatically predict optimized camera exposure values from a current image frame captured by the digital camera. Further, this prediction is made by the regression network as an implicit function (1130) of scene semantics extracted from the current image frame by the regression network. Finally, in various implementations the Exposure Controller applies (1140) the predicted camera exposure values to the digital camera to capture a next image frame.

Figure 12:
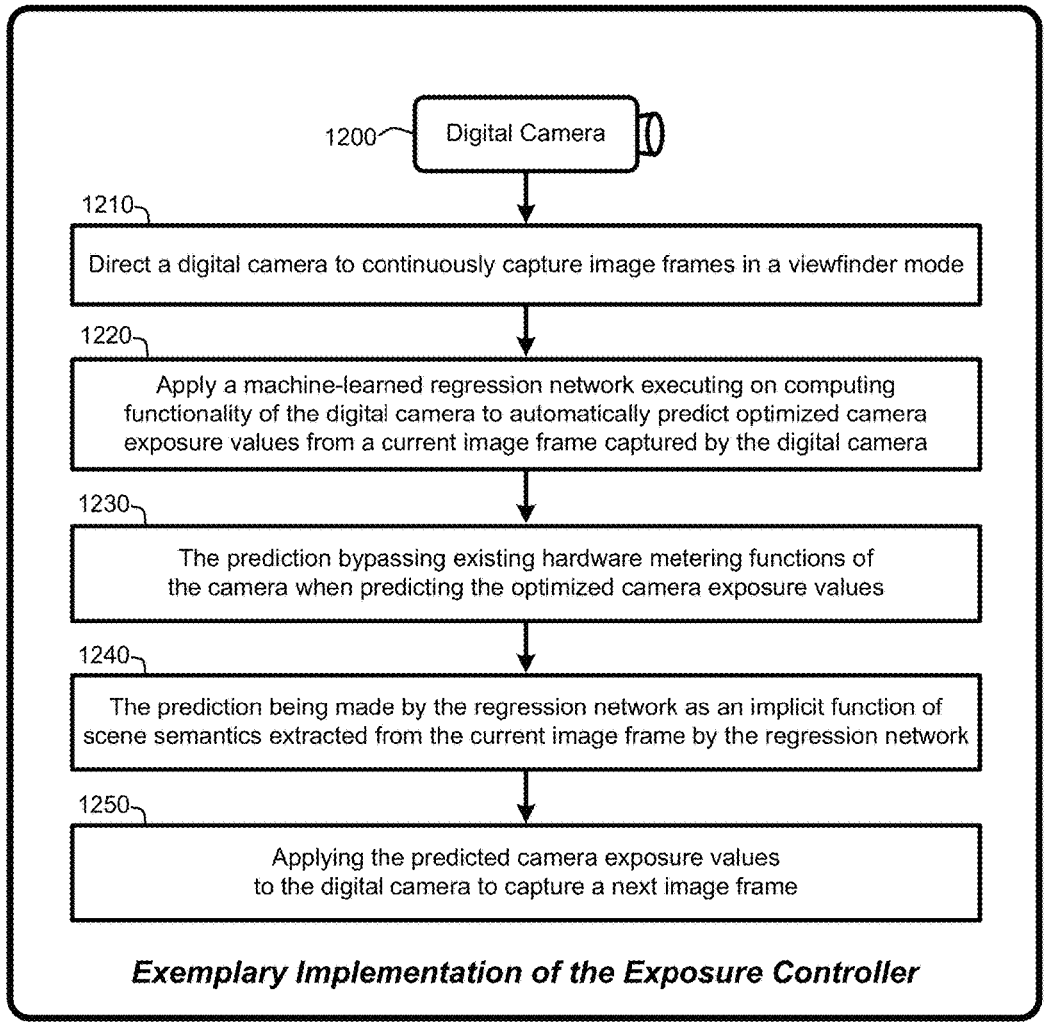
FIG. 12 illustrates a general system flow diagram that illustrates exemplary techniques for effecting various implementations of the Exposure Controller, as described herein.

Similarly, as illustrated by FIG. 12, in various implementations, the Exposure Controller begins operation directing (1210) a digital camera 1200 to continuously capture image frames in a viewfinder mode. In addition, the Exposure Controller applies (1220) a machine-learned regression network executing on computing functionality of the digital camera to automatically predict optimized camera exposure values from a current image frame captured by the digital camera. In various implementations, the prediction bypasses (1230) existing hardware metering functions of the camera when predicting the optimized camera exposure values. Further, in various implementations, the prediction is made by the regression network as an implicit function (1240) of scene semantics extracted from the current image frame by the regression network. Finally, in various implementations, the Exposure Controller applies (1250) the predicted camera exposure values to the digital camera to capture a next image frame.

4.0 Exemplary Implementations of the Exposure Controller:

The following paragraphs summarize various examples of implementations that may be claimed in the present document. The implementations summarized below are not intended to limit the subject matter that may be claimed in view of the detailed description of the Exposure Controller. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, an Exposure Controller is implemented by means, processes or techniques for training and applying a deep convolution network to provide real-time automated camera exposure control, as a real-time function of scene semantics context, in a way that improves image quality for a wide range of image subject types in a wide range of real-world lighting conditions.

As a first example, in various implementations, the Exposure Controller is implemented as a system operating within a digital camera via means, processes or techniques that begin operation by directing the camera to continuously capture image frames. In various implementations, this system includes a machine-learned regression network executing on computing functionality of the camera. The regression network automatically predicts optimized camera exposure values from a current image frame captured by the camera. Further, the prediction is made by the regression network as an implicit function of scene semantics extracted from the current image frame. Finally, in various implementations, the camera applies the predicted camera exposure values to capture a next image frame.

As a second example, in various implementations, the first example is further modified via means, processes or techniques wherein capture of the next image frame is delayed by an adjustable number of the continuously captured frames after applying the predicted camera exposure values.

As a third example, in various implementations, the second example is further modified via means, processes or techniques wherein the adjustable number of frames is dependent on a latency of a firmware response time of the camera.

As a fourth example, in various implementations, any of the first example, the second, and the third example are further modified via means, processes or techniques wherein the regression network is a machine-learned pre-trained network (PTN).

As a fifth example, in various implementations, the fourth example is further modified via means, processes or techniques wherein the PTN is generated by pre-training a deep convolution network by applying supervised learning to a set of training images and corresponding camera exposure data to mimic an exposure control system of a camera type applied to capture the set of training images.

As a sixth example, in various implementations, any of the first example, the second, and the third example are further modified via means, processes or techniques further comprising wherein the regression network is a machine-learned reward network (RN).

As a seventh example, in various implementations, the sixth example is further modified via means, processes or techniques wherein the RN is generated by training a deep convolution network on human scored image sets and corresponding camera exposure data to emulate human perception with respect to gauging image exposure quality as a function of exposure settings and semantics associated with those scored image sets.

As an eighth example, in various implementations, the first example is further modified via means, processes or techniques wherein the regression network is a contextual-bandit network (CBN), the CBN being generated by refining a machine-learned pre-trained network (PTN) via a machine-learned reward network (RN) by contextual-bandit learning.

As a ninth example, in various implementations, any of the first example, the second example, the third example, the fourth example, the fifth example, the sixth example, the seventh example, and the eighth example are further modified via means, processes or techniques further comprising bypassing existing hardware metering functions of the camera when predicting the optimized camera exposure values.

As a tenth example, in various implementations, an Exposure Controller is implemented by a general purpose computing device via means, processes or techniques that begin operation by directing a digital camera to continuously capture image frames in a viewfinder mode whether or not a camera shutter button has been activated. Further, in various implementations, the Exposure Controller applies a machine-learned regression network executing on computing functionality of the digital camera to automatically predict optimized camera exposure values from a current image frame captured by the digital camera. The prediction is made by the regression network as an implicit function of scene semantics extracted from the current image frame by the regression network. In addition, the Exposure Controller applies the predicted camera exposure values to the digital camera to capture a next image frame.

As an eleventh example, in various implementations, the tenth example is further modified via means, processes or techniques further comprising delaying capture of the next image frame by an adjustable number of the continuously captured frames after applying the predicted camera exposure values to the digital camera. Further, in this example, the adjustable number of frames is dependent on a latency of a firmware response time of the digital camera.

As a twelfth example, in various implementations, the tenth example is further modified via means, processes or techniques wherein the regression network is a machine-learned pre-trained network (PTN).

As a thirteenth example, in various implementations, the twelfth example is further modified via means, processes or techniques wherein the PTN is generated by pre-training a deep convolution network by applying supervised learning to a set of training images and corresponding camera exposure data to mimic an exposure control system of a camera type applied to capture the set of training images.

As a fourteenth example, in various implementations, the tenth example is further modified via means, processes or techniques wherein the regression network is a machine-learned reward network (RN).

As a fifteenth eleventh example, in various implementations, the fourteenth example is further modified via means, processes or techniques wherein the RN is generated by training a deep convolution network on human scored image sets and corresponding camera exposure data to emulate human perception with respect to gauging image exposure quality as a function of exposure settings and semantics associated with those scored image sets.

As a sixteenth example, in various implementations, the tenth example is further modified via means, processes or techniques wherein the regression network is a contextual-bandit network (CBN), the CBN being generated by refining a machine-learned pre-trained network (PTN) via a machine-learned reward network (RN) by contextual-bandit learning.

As a seventeenth example, in various implementations, any of the tenth example, the eleventh example, the twelfth example, the thirteenth example, the fourteenth example, the fifteenth example, and the sixteenth example are further modified via means, processes or techniques further comprising bypassing existing hardware metering functions of the camera when predicting the optimized camera exposure values.

As an eighteenth example, in various implementations, the Exposure Controller is implemented by a general purpose computing device via means, processes or techniques that begin operation by directing a digital camera to continuously capture image frames in a viewfinder mode. Further, in this example, the Exposure Controller applies a machine-learned regression network executing on computing functionality of the digital camera to automatically predict optimized camera exposure values from a current image frame captured by the digital camera. When making this prediction, the Exposure Controller bypasses existing hardware metering functions of the camera when predicting the optimized camera exposure values. Further, the prediction is made by the regression network as an implicit function of scene semantics extracted from the current image frame by the regression network. Finally, in various implementations, the Exposure Controller applies the predicted camera exposure values to the digital camera to capture a next image frame.

As a nineteenth example, in various implementations, the eighteenth example is further modified via means, processes or techniques wherein the regression network is a contextual-bandit network (CBN), the CBN being generated by refining a machine-learned pre-trained network (PTN) via a machine-learned reward network (RN) by contextual-bandit learning.

As a twentieth example, in various implementations, any of the eighteenth example and the nineteenth example are further modified via means, processes or techniques wherein capture of the next image frame is delayed by an adjustable number of the continuously captured frames after applying the predicted camera exposure values.

Figure 13:
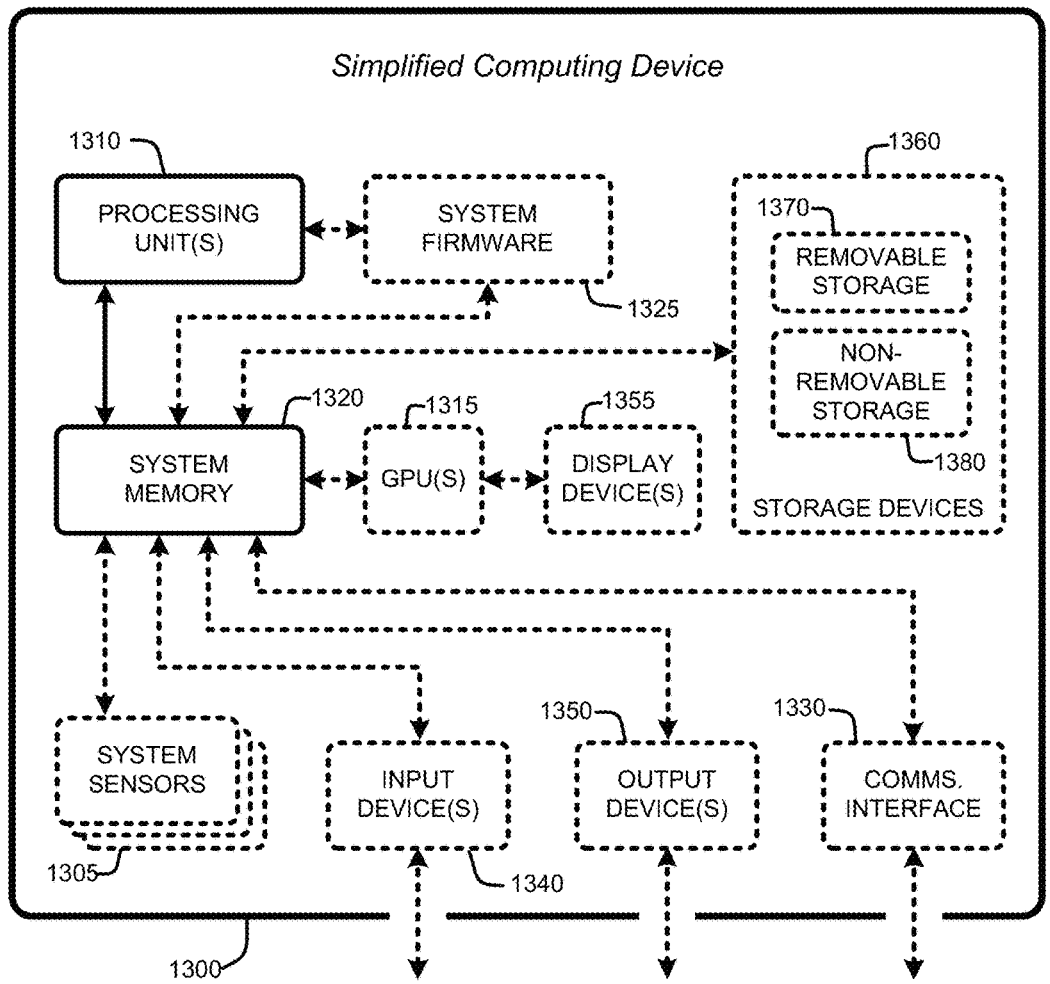
FIG. 13 is a general system diagram depicting a simplified general-purpose computing device having simplified computing and I/O capabilities for use in effecting various implementations of the Exposure Controller, as described herein.

5.0 Exemplary Operating Environments:

The Exposure Controller implementations described herein are operational within numerous types of general purpose or special purpose computing system environments or configurations. FIG. 13 illustrates a simplified example of a general-purpose computer system on which various implementations and elements of the Exposure Controller, as described herein, may be implemented. Any boxes that are represented by broken or dashed lines in the simplified computing device 1300 shown in FIG. 13 represent alternate implementations of the simplified computing device. As described below, any or all of these alternate implementations may be used in combination with other alternate implementations that are described throughout this document.

The simplified computing device 1300 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Exposure Controller implementations described herein, the device should have a sufficient computational capability and system memory to enable basic computational operations. In particular, the computational capability of the simplified computing device 1300 shown in FIG. 13 is generally illustrated by one or more processing unit(s) 1310, and may also include one or more graphics processing units (GPUs) 1315, either or both in communication with system memory 1320. The processing unit(s) 1310 of the simplified computing device 1300 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 1300 may also include other components, such as, for example, a communications interface 1330. The simplified computing device 1300 may also include one or more conventional computer input devices 1340 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 1300 and with any other component or feature of the Exposure Controller, including input, output, control, feedback, and response to one or more users or other devices or systems associated with the Exposure Controller, are enabled by a variety of Natural User Interface (NUI) scenarios. The NUI techniques and scenarios enabled by the Exposure Controller include, but are not limited to, interface technologies that allow one or more users user to interact with the Exposure Controller in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 1340 or system sensors 1305. Such NUI implementations are also enabled by the use of various techniques including, but not limited to, information derived from system sensors 1305 or other input devices 1340 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Exposure Controller.

However, the aforementioned exemplary NUI scenarios may be further augmented by combining the use of artificial constraints or additional signals with any combination of NUI inputs. Such artificial constraints or additional signals may be imposed or generated by input devices 1340 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Exposure Controller.

The simplified computing device 1300 may also include other optional components such as one or more conventional computer output devices 1350 (e.g., display device(s) 1355, audio output devices, video output devices, devices for transmitting wired or wireless data transmissions, and the like). Typical communications interfaces 1330, input devices 1340, output devices 1350, and storage devices 1360 for general-purpose computers are well known to those skilled in the art, and will not be described in detail herein.

The simplified computing device 1300 shown in FIG. 13 may also include a variety of computer-readable media. Computer-readable media can be any available media that can be accessed by the computing device 1300 via storage devices 1360, and include both volatile and nonvolatile media that is either removable 1370 and/or non-removable 1380, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Exposure Controller implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 1325, hardware, or any combination thereof to control a computer to implement the disclosed subject matter. The term "article of manufacture" as used herein is intended to encompass a computer program accessible from any computer-readable device, or media.

The Exposure Controller implementations described herein may be further described in the general context of computer-executable instructions, such as program modules, being executed by a computing device. Generally, program modules include routines, programs, objects, components, data structures, and the like, that perform particular tasks or implement particular abstract data types. The Exposure Controller implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the Exposure Controller has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Exposure Controller. It is intended that the scope of the Exposure Controller be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Exposure Controller described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A system, comprising:
a digital camera configured to capture image frames; and
a machine-learned pre-trained network (PTN) executing on the digital camera, the PTN generated by pre-training a deep convolution network by applying supervised machine learning to a set of training images and corresponding camera exposure data to mimic an exposure control system of a camera type used to capture the set of training images, such that the PTN automatically predicts camera exposure values from a current image frame captured by the digital camera as an implicit function of scene semantics extracted from the current image frame; and
wherein the digital camera is configured to apply the predicted camera exposure values to capture a next image frame.

2. The system of claim 1 wherein capture of the next image frame is delayed by an adjustable number of the captured frames after applying the predicted camera exposure values.

3. The system of claim 2 wherein the adjustable number of frames is dependent on a latency of a firmware response time of the camera.

4. The system of claim 1 further comprising bypassing existing hardware metering functions of the camera when predicting the camera exposure values.

5. A system, comprising:
a digital camera configured to capture image frames; and
a machine-learned reward network (RN) executing on the digital camera, the RN generated by training a deep convolution network on human scored image sets and corresponding camera exposure data to emulate human perception with respect to gauging image exposure quality as a function of exposure settings and semantics associated with those scored image sets, such that the RN automatically predicts camera exposure values from a current image frame captured by the digital camera as an implicit function of scene semantics extracted from the current image frame; and
wherein the digital camera is configured to apply the predicted camera exposure values to capture a next image frame.

6. The system of claim 5 wherein capture of the next image frame is delayed by an adjustable number of the captured frames after applying the predicted camera exposure values.

7. The system of claim 6 wherein the adjustable number of frames is dependent on a latency of a firmware response time of the camera.

8. The system of claim 5 further comprising bypassing existing hardware metering functions of the camera when predicting the camera exposure values.

9. A method, comprising:
capturing a set of image frames via a digital camera;
predicting, via a machine-learned pre-trained network (PTN) executing on the digital camera, camera exposure values from a current image frame captured by the digital camera as an implicit function of scene semantics extracted from the current image frame, the PTN generated by pre-training a deep convolution network by applying supervised machine learning to a set of training images and corresponding camera exposure data to mimic an exposure control system of a camera type used to capture the set of training images; and
applying the predicted camera exposure values to capture a next image frame.

10. The method of claim 9 wherein the next image frame is captured after a dynamically adjustable latency interval during which the predicted camera exposure values are applied, and wherein the dynamically adjustable latency interval is dependent on a latency of a firmware response time of the camera.

11. The method of claim 9 further comprising bypassing existing hardware metering functions of the camera when predicting the camera exposure values.

* * * * *